United States Patent
Agrawal et al.

(10) Patent No.: US 10,607,229 B2
(45) Date of Patent: Mar. 31, 2020

(54) SYSTEMS AND METHODS FOR MANAGING CASH ADVANCES

(71) Applicant: Capital One Services, LLC, McLean, VA (US)

(72) Inventors: Abhinav Agrawal, Washington, DC (US); Riken Shah, Ashburn, VA (US); Joshua Wilbur, Potomac, MD (US); Jeffrey Samitt, Glen Allen, VA (US); Colleen Kerr, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 87 days.

(21) Appl. No.: 15/975,441

(22) Filed: May 9, 2018

(65) Prior Publication Data
US 2019/0347664 A1    Nov. 14, 2019

(51) Int. Cl.
*G06Q 40/00* (2012.01)
*G06Q 20/40* (2012.01)
*G06Q 20/10* (2012.01)
*G06Q 20/24* (2012.01)
*G06Q 20/34* (2012.01)

(52) U.S. Cl.
CPC ....... *G06Q 20/405* (2013.01); *G06Q 20/1085* (2013.01); *G06Q 20/24* (2013.01); *G06Q 20/34* (2013.01); *G06Q 20/4012* (2013.01)

(58) Field of Classification Search
CPC ........ G06Q 20/10; G06Q 40/02; G06Q 40/00; G06Q 20/1085; G06Q 20/40
See application file for complete search history.

(56) References Cited

U.S. PATENT DOCUMENTS

| | | | |
|---|---|---|---|
| 2008/0040265 A1* | 2/2008 | Rackley, III | G06Q 20/02 705/40 |
| 2008/0172340 A1* | 7/2008 | Karlsson | G06Q 20/401 705/75 |

(Continued)

OTHER PUBLICATIONS www.engadget.com/2014/07/24/iphone-101-add-labels-to-your-on-off-toggles-in-ios/, Sep. 24, 2014, Engaget (Year: 2014).*

(Continued)

*Primary Examiner* — Mike Anderson
(74) *Attorney, Agent, or Firm* — Finnegan, Henderson, Farabow, Garrett & Dunner, LLP

(57) ABSTRACT

Systems and methods are provided for managing a cash advance service associated with a payment account of a user. An exemplary method may include providing, to a device of the user, instructions to display an application interface, the application interface receiving user requests to enable and disable the cash advance service. The method may also include receiving, through the application interface, a request to enable the cash advance service. The method may further include associating a transaction rule with the payment account, the transaction rule defining a condition upon which approval of a cash advance transaction is permitted. The method may further include receiving a cash advance transaction authorization request associated with the payment account. The method may further include approving the cash advance transaction authorization request when the condition is met and declining the cash advance transaction authorization request when the condition is not met.

16 Claims, 24 Drawing Sheets

(56) References Cited

U.S. PATENT DOCUMENTS

| | | | | |
|---|---|---|---|---|
| 2010/0078471 A1* | 4/2010 | Lin | ................ | G06O 40/02 |
| | | | | 235/379 |
| 2010/0082485 A1* | 4/2010 | Lin | ................ | G06Q 20/12 |
| | | | | 705/44 |
| 2013/0268417 A1* | 10/2013 | Sgueglia | ................ | G06Q 40/10 |
| | | | | 705/30 |
| 2018/0176727 A1* | 6/2018 | Williams | ................ | A61B 5/6802 |

OTHER PUBLICATIONS

Toggle_feature_iphone_-_Google_Search_-_Search_History.pdf, "What does toggle mean on an iPhone?", Jul. 24, 2014, (Year: 2014).* www.commbank.com.au/personal/credit-cards/lock-block-limit.html, Lock, block and limit your credit card., Nov. 1, 2017 (Year: 2017).*

Robert McGarvey, Discover Card Debuts _Freeze It_ Tool to Let Users Turn Off Their Own Accounts—Do You Need It_—TheStreet, Apr. 23, 2015 (Year: 2015).*

* cited by examiner

SYSTEMS AND METHODS FOR MANAGING CASH ADVANCES

TECHNICAL FIELD

The present disclosure relates to systems and methods for managing cash advances associated with a payment account.

BACKGROUND

A cash advance allows a customer to use his/her payment card, such as a credit card, to obtain short-term cash loan at a bank or automated teller machine (ATM).

In current payment systems, a cash advance transaction can be made at a bank using a payment card and an ID showing that the person making the cash advance transaction is an authorized user of the payment card. A cash advance transaction can also be made at an ATM using the payment card and a personal identification number (PIN) associated with the payment card. While the cash advance feature provides convenience to the customer when cash is needed, cash advance-related frauds significantly undermine its utility. For example, a fraudster may steal someone's payment card and obtain cash from a bank using the stolen payment card and a fake ID. In another example, a fraudster may steal the payment card information and its associated PIN, and obtain cash at an ATM using the stolen combination. It is difficult for current payment systems to prevent or deter such fraudulent activities.

Thus, there is a need for systems and methods capable of providing additional safeguards to manage cash advances to reduce cash advance related frauds.

SUMMARY

In one aspect, the present disclosure provides a system for managing a cash advance service associated with a payment account of a user. The system may include one or more memory devices storing instructions and one or more processors configured to execute the instructions to perform various operations. The operations may include providing, to a device of the user, instructions to display an application interface. The application interface may receive user requests to enable and disable the cash advance service. The operations may also include receiving, through the application interface, a request to enable the cash advance service. In response to the request, the operations may include associating a transaction rule with the payment account. The transaction rule may define a condition upon which approval of a cash advance transaction is permitted. The operations may further include receiving a cash advance transaction authorization request associated with the payment account. The operations may further include approving the cash advance transaction authorization request when the condition is met. The operations may further include declining the cash advance transaction authorization request when the condition is not met.

In another aspect, the present disclosure provides a computer-implemented method for managing a cash advance service associated with a payment account of a user. The method may include providing, to a device of the user, instructions to display an application interface. The application interface may receive user requests to enable and disable the cash advance service. The method may also include receiving, through the application interface, a request to enable the cash advance service. In response to the request, the method may include associating a transaction rule with the payment account. The transaction rule may define a condition upon which approval of a cash advance transaction is permitted. The method may further include receiving a cash advance transaction authorization request associated with the payment account. The method may further include approving the cash advance transaction authorization request when the condition is met. The method may further include declining the cash advance transaction authorization request when the condition is not met.

In yet another aspect, the present disclosure provides a non-transitory computer-readable medium storing instructions executable by a processor to cause the processor to perform operations for managing a cash advance service associated with a payment account of a user. The operations may include providing, to a device of the user, instructions to display an application interface. The application interface may receive user requests to enable and disable the cash advance service. The operations may also include receiving, through the application interface, a request to enable the cash advance service. In response to the request, the operations may include associating a transaction rule with the payment account. The transaction rule may define a condition upon which approval of a cash advance transaction is permitted. The operations may further include receiving a cash advance transaction authorization request associated with the payment account. The operations may further include approving the cash advance transaction authorization request when the condition is met. The operations may further include declining the cash advance transaction authorization request when the condition is not met.

In a further aspect, the present disclosure provides a system for temporarily enabling a cash advance feature associated with a payment account of a user. The system may include one or more memory devices storing instructions and one or more processors configured to execute the instructions to perform various operations. The operations may include receiving a transaction authorization request for a cash advance from the payment account. The operations may also include determining, responsive to the reception of the transaction authorization request, whether the cash advance feature associated with the payment account is enabled, based on a cash advance indicator associated with the payment account. Responsive to the determination that the cash advance feature is not enabled, the operations may further include declining the transaction authorization request and providing instructions to a user device, associated with the user, for displaying an application interface receiving user requests to enable the cash advance feature. The operations may also include receiving, from the user device, a request to enable the cash advance feature. Responsive to the request, the operations may include temporarily enabling the cash advance feature by modifying the cash advance indicator to permit approval of a subsequent cash advance transaction authorization request.

In another aspect, the present disclosure provides a computer-implemented method for temporarily enabling a cash advance feature associated with a payment account of a user. The method may include receiving a transaction authorization request for a cash advance from the payment account. The method may also include determining, responsive to the reception of the transaction authorization request, whether the cash advance feature associated with the payment account is enabled, based on a cash advance indicator associated with the payment account. Responsive to the determination that the cash advance feature is not enabled, the method may further include declining the transaction authorization request and providing instructions to a user device, associated with the user, for displaying an application interface receiving user requests to enable the cash advance feature. The method may also include receiving, from the user device, a request to enable the cash advance feature. Responsive to the request, the method may also include temporarily enabling the cash advance feature by modifying the cash advance indicator thereby temporarily allowing approval of a subsequent cash advance transaction authorization request.

In another aspect, the present disclosure provides a non-transitory computer-readable medium storing instructions executable by a processor to cause the processor to perform operations for temporarily enabling a cash advance feature associated with a payment account of a user. The operations may include receiving a transaction authorization request for a cash advance from the payment account. The operations may also include determining, responsive to the reception of the transaction authorization request, whether the cash advance feature associated with the payment account is enabled, based on a cash advance indicator associated with the payment account. Responsive to the determination that the cash advance feature is not enabled, the operations may further include declining the transaction authorization request and providing instructions to a user device, associated with the user, for displaying an application interface receiving user requests to enable the cash advance feature. The operations may also include receiving, from the user device, a request to enable the cash advance feature. Responsive to the request, the operations may include temporarily enabling the cash advance feature by modifying the cash advance indicator to permit approval of a subsequent cash advance transaction authorization request.

The foregoing general description and the following detailed description are exemplary and are not restrictive to the claims.

BRIEF DESCRIPTION OF THE DRAWINGS

The accompanying drawings, which are incorporated in and constitute a part of this specification, illustrate several embodiments and, together with the description, serve to explain the disclosed embodiments. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

The present disclosure describes systems and methods for managing a cash advance service (also referred to as a cash advance feature) associated with a payment account of a user. Embodiments of the present disclosure allow the user to enable and disable the cash advance service through an application interface provided on a user device. When enabled, the cash advance service may be automatically turned off or disabled after a predetermined or user-defined time period.

Figure 1:
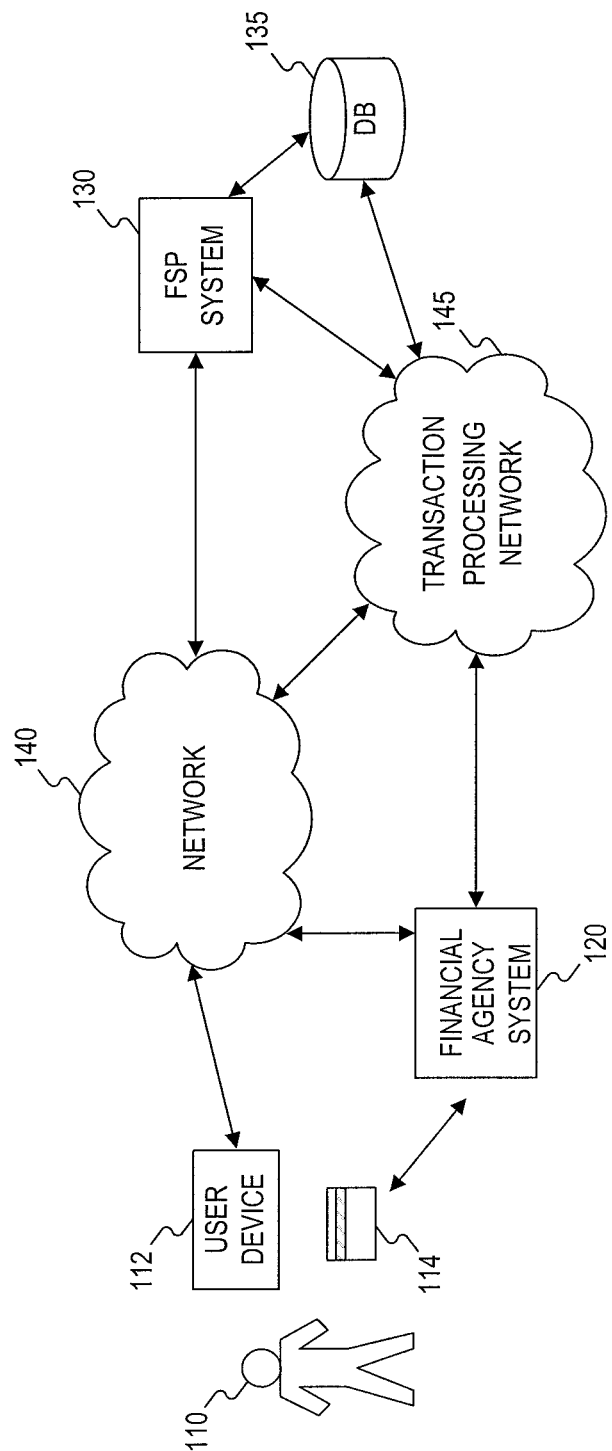
FIG. 1 is a block diagram of an exemplary system, consistent with the disclosed embodiments.

FIG. 1 shows a diagram of an exemplary system 100 configured to manage a cash advance service, consistent with disclosed embodiments.

As shown in FIG. 1, system 100 may include one or more user devices 112 and payment cards 114 associated with a payment account of a user 110. For example, the payment account may include a credit card account, a charge card account, etc. Payment card 114 may include a credit card, a charge card, etc. System 100 may also include a financial agency system 120 with which user 110 may enter into a cash advance transaction using payment card 114 or user device 112. Financial agency system 120 may include an ATM at, e.g., a convenience store, a cash advance processing machine at a bank, or the like. Financial agency system 120 may communicate with a financial service provider (FSP) system 130 via a transaction processing network 145 to authorize the cash advance transaction. System 100 may also include a database 135 accessible to FSP system 130 and/or transaction processing network 145 to authorize or otherwise process the transaction, among other things. System 100 may also include a network 140 to facilitate communication among the components of system 100. Network 140 may also facilitate a user device 112 to communicate with FSP system 130 to request and register with the financial service provider one or more transaction rules to be associated with the user's payment account.

The components and arrangement of the components included in system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

A user 110 may operate a user device 112, which may be a desktop computer, laptop, tablet, smartphone, multifunctional watch, pair of multifunctional glasses, tracking device, or any suitable device with computing capability.

User device 112 may have a financial application installed thereon, which may enable user device 112 to communicate with FSP system 130 via network 140 and perform aspects of the disclosed embodiments. For example, user device 112 may connect to FSP system 130 through use of browser software, mobile application software, or the like. User device 112 may allow a user to access information stored in FSP system 130, such as, for example, financial information related to recent purchase transactions, financial statements, account information, rewards program information and the like. User device 112 may also be configured to manage the cash advance service associated with user 110's payment account with the financial service provider. An exemplary computer system consistent with user device 112 is discussed in greater detail with respect to FIG. 2.

User 110 may operate user device 112 to perform one or more operations for managing a customer or client account associated with FSP system 130, such as entering a cash advance transaction. In some aspects, user 110 may be a customer or client of a financial service provider associated with FSP system 130. For instance, a financial service provider may maintain a financial service account (e.g., credit card account, charge card account, etc.) that user 110 may use in a cash advance transaction, such as, for example, a cash advance transaction initiated at an ATM, a bank, or other types of the financial agency system. Consistent with disclosed embodiments, user 110 may operate user device 112 to manage (e.g., enable or disable) the cash advance service or feature associated with the user's payment account. A cash advance transaction may be initiated with a financial agency system 120 using any known method, such as presentation of a payment card 114 (e.g., a charge card or credit card), or presentation of payment card information. Further, user 110 may operate user device 112 to view a financial service account status report or financial statement provided by a financial service provider or FSP system 130, and perform certain requests to enable or disable the cash advance service.

Payment card 114 may include a physical card, a dongle, a fob, an e-wallet, an electronic device, or other payment device, typically issued by a financial service provider and associated with a customer or client account. Payment card 114 enables user 110 to enter into a cash advance transaction. In some embodiments, payment card 114 may be presented at a bank or any other types of financial agency system 120 to initiate a cash advance transaction.

In accordance with disclosed embodiments, FSP system 130 may be a system associated with a financial service provider (not shown), such as a bank, a credit card company, a lender, brokerage firm, or any other type of financial service entity that generates, provides, manages, and maintains financial service accounts for users 110. FSP system 130 may include one or more computing systems that are configured to execute software instructions stored on one or more memory devices to perform operations consistent with the disclosed embodiments. For example, FSP system 130 may include one or more memory device(s) storing data and software instructions and one or more processor(s) configured to use the data and execute the software instructions to perform server-based functions and operations known to those skilled in the art. FSP system 130 may include one or more computing components specifically programmed and combined or arranged to perform the disclosed methods.

In certain embodiments, FSP system 130 may be configured as a particular apparatus, system, and the like, based on the storage, execution, and/or implementation of the software instructions that perform operations consistent with the disclosed embodiments. FSP system 130 may be a stand-alone system, or it may be part of a subsystem, which may be part of a larger system. For example, FSP system 130 may represent distributed servers that are remotely located and communicate over a public network (e.g., network 140) or a dedicated network, such as a LAN, for a financial service provider. An exemplary computing system consistent with FSP system 130 is discussed in additional detail with respect to FIG. 2, below.

FSP system 130 may include or may access one or more storage devices configured to store data and/or software instructions used by one or more processors of FSP system 130 to perform operations consistent with the disclosed embodiments. For example, FSP system 130 may include memory configured to store one or more software programs that perform functions when executed by a processor, including functions specific to the disclosed methods.

The disclosed embodiments are not limited to separate programs or computers configured to perform dedicated tasks. For example, FSP system 130 may include memory that stores a single program or multiple programs. Additionally, FSP system 130 may execute one or more programs located remotely from FSP system 130. For example, FSP system 130 may access one or more remote programs stored in memory included with a remote component (such as database 135) that, when executed, perform operations consistent with the disclosed embodiments.

In certain aspects, FSP system 130 and/or database 135 may include server software that generates, maintains, and provides services associated with processing financial transactions. In some embodiments, FSP system 130 may connect with separate server(s) or other computing devices associated with database 135 that generate, maintain, and provide services associated with financial data for a financial service provider associated with FSP system 130. For example, database 135 may include a plurality of storage and processing components and associated software for storing account information of customers or clients of a financial service provider for use in authorizing and processing a transaction. Database 135 may be associated with FSP system 130 and made accessible to transaction processing network 145 for performing various transaction authorization and processing functionality. In some embodiments, database 135 may be provided as part of transaction processing network 145.

System 100 may also include one or more financial agency systems 120. Financial agency system 120 may be a computing system that is associated with a financial institute or other business entity that provides financial services, such as a bank, a credit card issuer, a credit union, or any other type of entity that may engage in any financial transaction with a consumer. While system 100 is shown with one financial agency system 120 for ease of discussion, the disclosed embodiments may also be implemented in a system 100 including two or more financial agency systems 120 associated with any number of underlying entities (commercial or otherwise). Further, financial agency system 120 is not limited to conducting business in any particular industry or field.

Financial agency system 120 may be associated with a brick-and-mortar bank branch that a user 110 may physically visit and request a cash advance. Such physical locations may include computing devices that perform financial service transactions with consumers (e.g., Point of Sale (POS) terminal(s), kiosks, etc.). Financial agency system 120 may also include one or more ATMs from which user 110 may withdraw cash using payment card 114 and a PIN. Financial agency system 120 may also include back- and/or front-end computing components that store data and execute software instructions to perform operations consistent with the disclosed embodiments, such as computers that are operated by employees of the financial institutes (e.g., back office systems, etc.).

In one embodiment, financial agency system 120 may include one or more servers or other type of computer devices. The financial agency system server(s) may be one or more computing devices configured to execute software instructions stored in memory to perform processes consistent with the disclosed embodiments. For example, financial agency system 120 may include one or more memory device(s) storing data and software instructions, and one or more processor(s) configured to use the data and execute the software instructions to perform server-based functions and operations known to those skilled in the art.

Financial agency 120 may include one or more servers implemented as, for example, a general purpose computer, a mainframe computer, or any combination of these components. In certain embodiments, financial agency system 120 (or a system including financial agency system 120) may be configured as a particular apparatus, system, and the like based on the storage, execution, and/or implementation of the software instructions that perform operations consistent with the disclosed embodiments. A financial agency server may be standalone, or it may be part of a subsystem, which may be part of a larger system. For example, a financial agency server may represent distributed servers that are remotely located and communicate over a public network (e.g., network 140) or a dedicated network, such as a LAN. An exemplary computing system consistent with financial agency system 120 is discussed in additional detail with respect to FIG. 2.

In certain embodiments, a financial agency may operate computing components associated with financial agency system 120 to perform processes consistent with the disclosed embodiments. For example, financial agency system 120 may be configured to execute software instructions to provide transaction data and/or other data relating to cash advance transactions to FSP system 130 over network 140 or transaction processing network 145. Additionally, financial agency system 120 may be configured to execute software instructions to perform pre-authorization and other transaction processing operations regarding a cash advance transaction entered into using a financial service account associated with FSP system 130. These processes may be performed using transaction processing network 145 that may be in communication with FSP system 130 and database 135.

Transaction processing network 145 may include a plurality of computing components, systems, and subsystems in communication with financial agency system 120, FSP system 130, and database 135 for processing a cash advance transaction. For conciseness, transaction processing network 145 may include any configuration or combination of known transaction processing networks and systems implemented for authorizing, clearing, and settling a cash advance transaction. Transaction processing network 145 may generally include the underlying systems for receiving a cash advance transaction authorization request from a financial agency system 120, performing verification and fraud analysis on the cash advance request, communicating with a FSP system 130 associated with the cash advance request, providing an authorization decision to financial agency system 120, clearing an authorized transaction, and settling the transaction through the payment of funds or otherwise. In some embodiments, transaction processing network 145 may include a number of systems not shown, such as a financial service provider system associated with financial agency system 120, a third party transaction processor system, a card network and processing system (e.g., such as Visa, MasterCard, etc.) and any other systems related to processing cash advance transactions. In some embodiments, aspects of transaction processing network 145 may include aspects of network 140 for the communication of various transaction data or other communications between various systems of payment processing network 145.

Network 140 may comprise any type of computer networking arrangement used to exchange data. For example, network 140 may be the Internet, a private data network, a virtual private network using a public network, a WiFi network, a LAN or WAN network, and/or other suitable connections that may enable information exchange among various components of system 100. Network 140 may also include a public switched telephone network ("PSTN") and/or a wireless cellular network. Network 140 may be a secured network or unsecured network. In some embodiments, one or more components of system 100 may communicate directly through a dedicated communication link(s), such as links between FSP system 130 and financial agency system 120.

Other components known to one of ordinary skill in the art may be included in system 100 to process, transmit, provide, and receive information consistent with the disclosed embodiments. In addition, although not shown in FIG. 1, components of system 100 may communicate with each other through direct communications, rather than through network 140. Direct communications may use any suitable technologies, including close range communication protocols, such as those employed under the name BLUETOOTH™ or BLUETOOTH LE™, and WiFi, or any known near field communications (NFC) techniques, or other suitable communication methods that provide a medium for transmitting data between separate devices.

Figure 2:
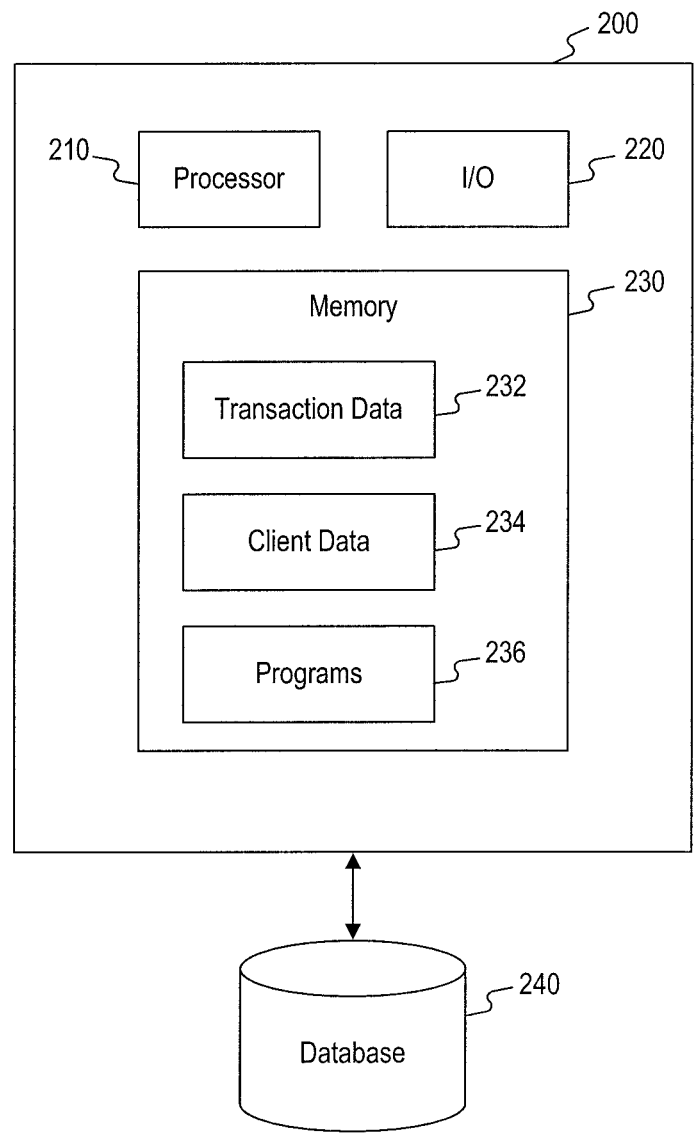
FIG. 2 is a block diagram of an exemplary computing system, consistent with the disclosed embodiments.

System 100 includes a number of components generally described as computing devices. Each of the computing devices may include any number of computing components particularly configured as a special purpose computing device to perform the functionality disclosed herein. FIG. 2 shows a diagram of an exemplary computing system 200 illustrating a computing system configuration that may be associated with FSP system 130, financial agency system 120, one or more payment processing systems provided as part of transaction processing network 145, and/or user device 112, consistent with the disclosed embodiments.

In one embodiment, computing system 200 may include one or more processors 210, one or more memories 230, and one or more input/output (I/O) devices 220. In some embodiments, computing system 200 may take the form of a server, specially-programmed computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone, or it may be part of a subsystem, which may be part of a larger system.

Processor 210 may include one or more known processing devices, such as a microprocessor. Processor 210 may constitute a single-core or multiple-core processor that executes parallel processes simultaneously. For example, processor 210 may be a single-core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions executable by processor 210 to perform operations associated with the disclosed embodiments. The disclosed embodiments are not limited to separate programs or computers configured to perform dedicated tasks. For example, memory 230 may include a program 236 that performs the functions of computing system 200, or program 236 could comprise multiple programs. Additionally, processor 210 may execute one or more programs located remotely from computing system 200. For example, FSP system 130, financial agency system 120, or user device 112, may, via computing system 200 (or variants thereof), access one or more remote programs that, when executed, perform functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely.

Programs executed by processor 210 may cause processor 210 to execute operations related to financial services provided to users including, but not limited to, processing cash advance transactions, credit and debit card transactions, checking transactions, fund deposits and withdrawals, transferring money between financial accounts, lending loans, processing payments for credit card and loan accounts, and generating and associating transaction rules to one or more accounts according to the disclosed embodiments.

Memory 230 may also store data that may reflect any type of information in any format that the system may use to perform operations consistent with the disclosed embodiments. Memory 230 may store instructions to enable processor 210 to execute applications, such as server applications, network communication processes, and any other type of application or software, including software directed to enabling a user or customer to enable and disable a cash advance service according to the disclosed embodiments. Alternatively, the instructions, application programs, etc., may be stored in an external storage (such as database 240) in communication with computing system 200 via network 140 or any other suitable network. Memory 230 may be a volatile or non-volatile, magnetic, semiconductor (e.g., EEPROM, flash memory, etc.), tape, optical, removable, non-removable, or other type of storage device or tangible (i.e., non-transitory) computer-readable medium.

Memory 230 may include transaction data 232. Transaction data 232 may include information related to cash advance transactions initiated by user 110. For example, transaction data may include a user identifier ("ID"), a cash advance amount, and any other relevant transaction or financial agency-specific information. The user identifier may be a credit or charge card number, an account number, or another means for identifying the user initiating the cash advance transaction. The cash advance amount may include a number representing the total amount of cash requested by user 110. In other embodiments, transaction data 232 may include other general information related to the cash advance transaction including the time and date of the transaction, reason for the transaction, etc.

In some embodiments, financial agency system 120 may collect, generate, and provide transaction data relating to cash advance transactions involving a user to FSP system 130 and/or other systems provided as part of transaction processing network 145. Financial agency system 120 may provide the transaction data to FSP system 130 via transaction processing network 145 or network 140. Alternatively, transaction data 232 may be stored in database 240, which may be an external storage device in communication with computing system 200 via network 140 or any other suitable network including transaction processing network 145.

Memory 230 may further include client data 234, which may include information about individual clients of the financial service provider. For example, client data 234 may include client account information, credit or charge card information, history of cash advance, purchase, and/or payment transactions, financial statements, and one or more transaction rules according to the disclosed embodiments. Client data 234 may include a data record associating a client account with one or more other accounts according to the one or more transaction rules. Client data 234 may further contain one or more user profiles corresponding to individual client accounts. In some embodiments, client data 234 may be stored in database 240, which may be an external storage device in communication with computing system 200 via network 140 or any other suitable network including transaction processing network 145.

Processor 210, upon execution of programs 236, may perform the functionality of the disclosed embodiments for managing a cash advance service or feature. In the disclosed embodiments, processor 210 may analyze received transaction data 232 in reference to one or more transaction rules associated with client data 234 to perform the disclosed functionality.

For example, processor 210 may analyze transaction data to determine which client having information stored in client information 234 is initiating the cash advance transaction. Additionally, processor 210 may analyze the transaction data 232 with respect to one or more transaction rules in association with client data 234 to determine whether the cash advance transaction may be authorized. In some embodiments, processor 210 may analyze a client request to enable cash advance service, and associate a transaction rule with the client account stored in client data 234 to update the client account information accordingly. Processor 210 may also access data records stored as client data 234 to determine client account information, charge or credit card information, history of purchase transactions, financial statements and/or one or more transaction rules associated with an account. Other programmable functions of processor 210 are described in greater detail below.

I/O devices 220 may be one or more devices configured to allow data to be received and/or transmitted by computing system 200. I/O devices 220 may include one or more digital and/or analog communication devices that allow computing system 200 to communicate with other machines and devices, such as other components of system 100 shown in FIG. 1. Computing system 200 may also include interface components for one or more input devices, such as keyboards, mouse devices, touch screens, and the like, which may enable computing system 200 to receive input from an operator of FSP system 130 (not shown) or from user 110.

Computing system 200 may also contain one or more database(s) 240, or may be communicatively connected to database(s) 240 through a direct connection and/or a network (e.g., network 140, transaction processing network 145, etc.). Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. Database 240 may include computing components (e.g., database management system, database server, etc.) configured to receive and process requests for data stored in memory devices of database(s) 240 and to provide data from database 240.

As discussed above, FSP system 130 may include at least one computing system 200. Further, although sometimes discussed here in relation to FSP system 130, it should be understood that variations of computing system 200 may be implemented in other components of system 100, including financial agency system 120, aspects of transaction processing network 145, and user device 112. Computing system 200 may be a single server or may be configured as a distributed computer system including multiple servers or computers that interoperate to perform processes and functionalities associated with the disclosed embodiments.

In some aspects, financial agency system 120 may include the same or similar configuration and/or components of computing system 200. Computing system 200 when implemented in financial agency system 120 may include any hardware and/or software installed therein necessary for performing methods and processes of the disclosed embodiments, such as for example, the processing of a cash advance transaction.

The following processes are directed to various embodiments for managing a cash advance service, such as enabling a user 110 to control whether or not to enable the cash advance service. In particular, the processes of some embodiments implement a time-based restriction on the use of a cash advance service. In some embodiments, the cash advance service is disabled by default, and a user 110 may enable the cash advance service for a limited time period. User 110 may also disable the cash advance service. The following processes may be performed by various aspects and components of system 100 and computing system 200, as is apparent from the disclosure.

Figure 3A:
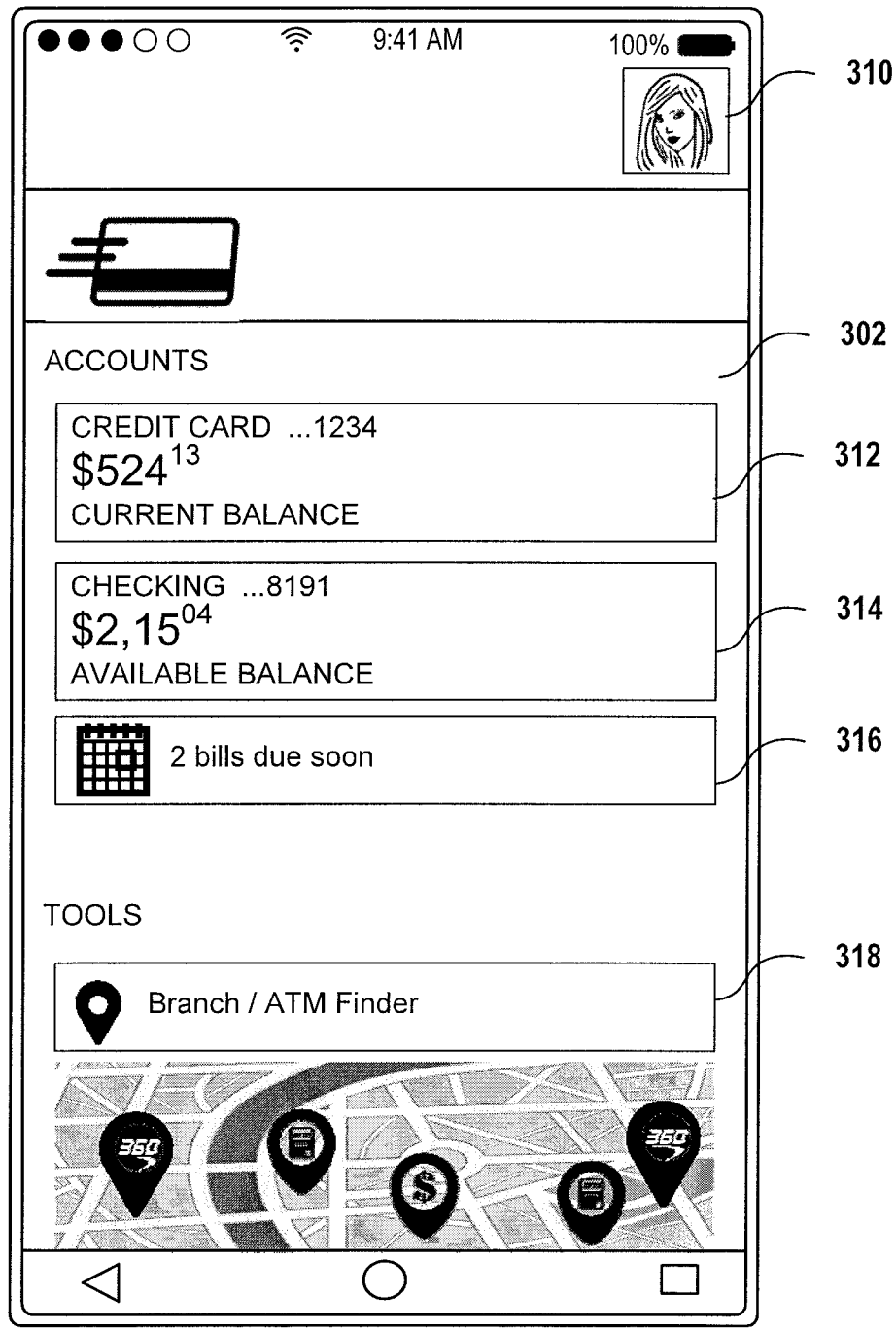
FIGS. 3A-3G are examples of a user device interface configured to receive user inputs to enable and disable a cash advance service, consistent with the disclosed embodiments.

FIGS. 3A-3G show a series of exemplary application interfaces that are configured to allow a user 110 to manage a cash advance service associated with a payment account of the user. The exemplary application interfaces may be part of a mobile application installed on user device 112, or may be implemented as part of a website or web portal that can be accessed by user 110 using a browser software application. FIG. 3A shows an exemplary interface 300 including several groups of general information associated with financial accounts of user 110. For example, interface 300 may include a user profile icon 310, such as a photo or avatar indicating the identify of user 110. Interface 300 may also include an account information portion 302, including, for example, a list of financial accounts of user 110, such as a credit card account 312, a checking account 314, and bills information 316. Interface 300 may also include a tools portion 318 including, for example, a map showing nearby branches or ATMs. In some embodiments, interface 300 may be the main interface or entry interface from which user 110 may view additional information or make any desirable changes to the account settings.

Figure 3B:
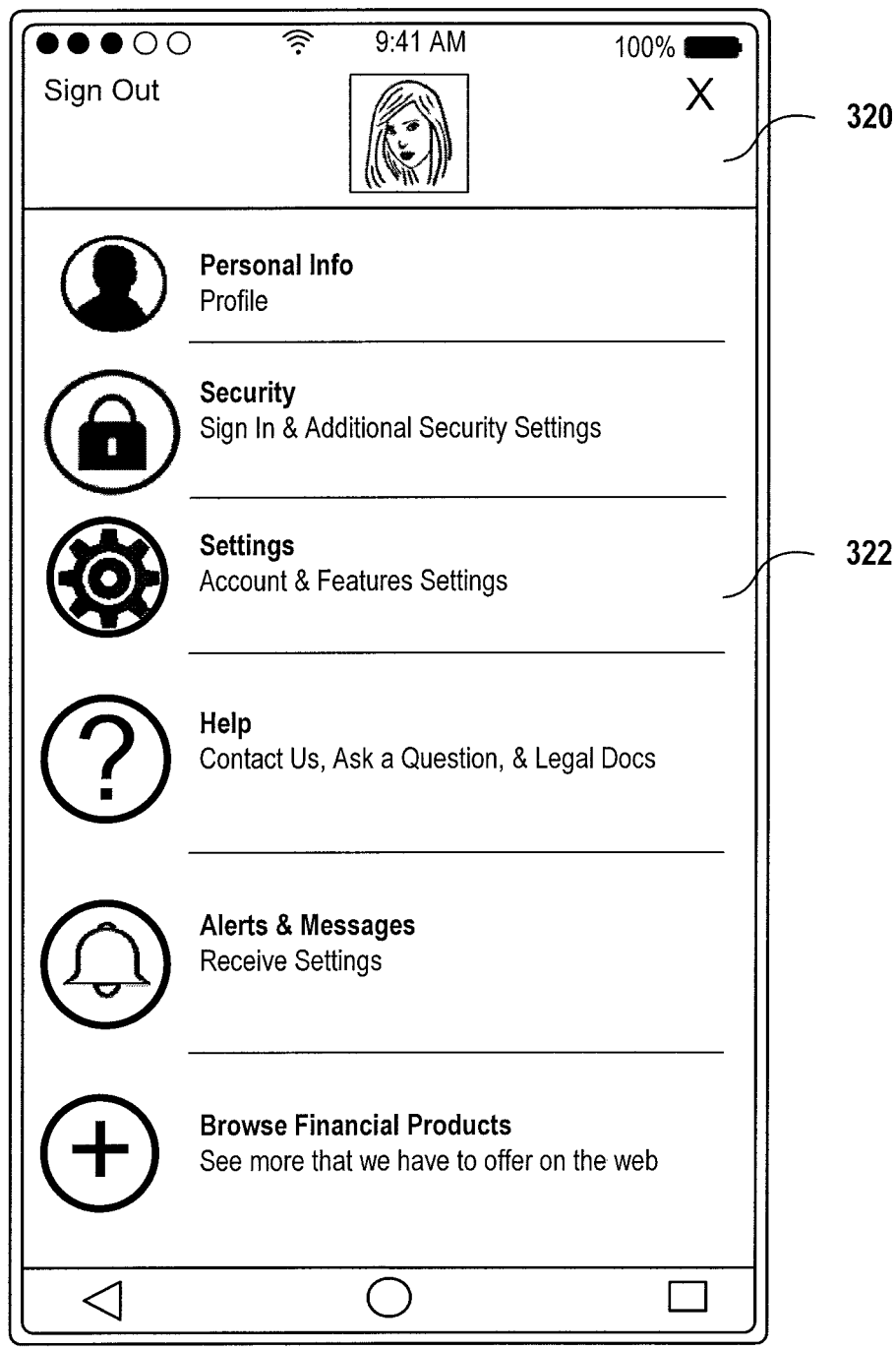

User 110 may select user profile icon 310 by clicking or touching the icon to access the user profile interface. An exemplary user profile interface 320 is shown in FIG. 3B. User profile interface 320 may include information such as personal profile, security settings, account & features settings, help information, alerts & messages, available financial products, etc., as shown in FIG. 3B. Among them, Settings 322 may include various settings for account features, such as a cash advance feature.

Figure 3C:
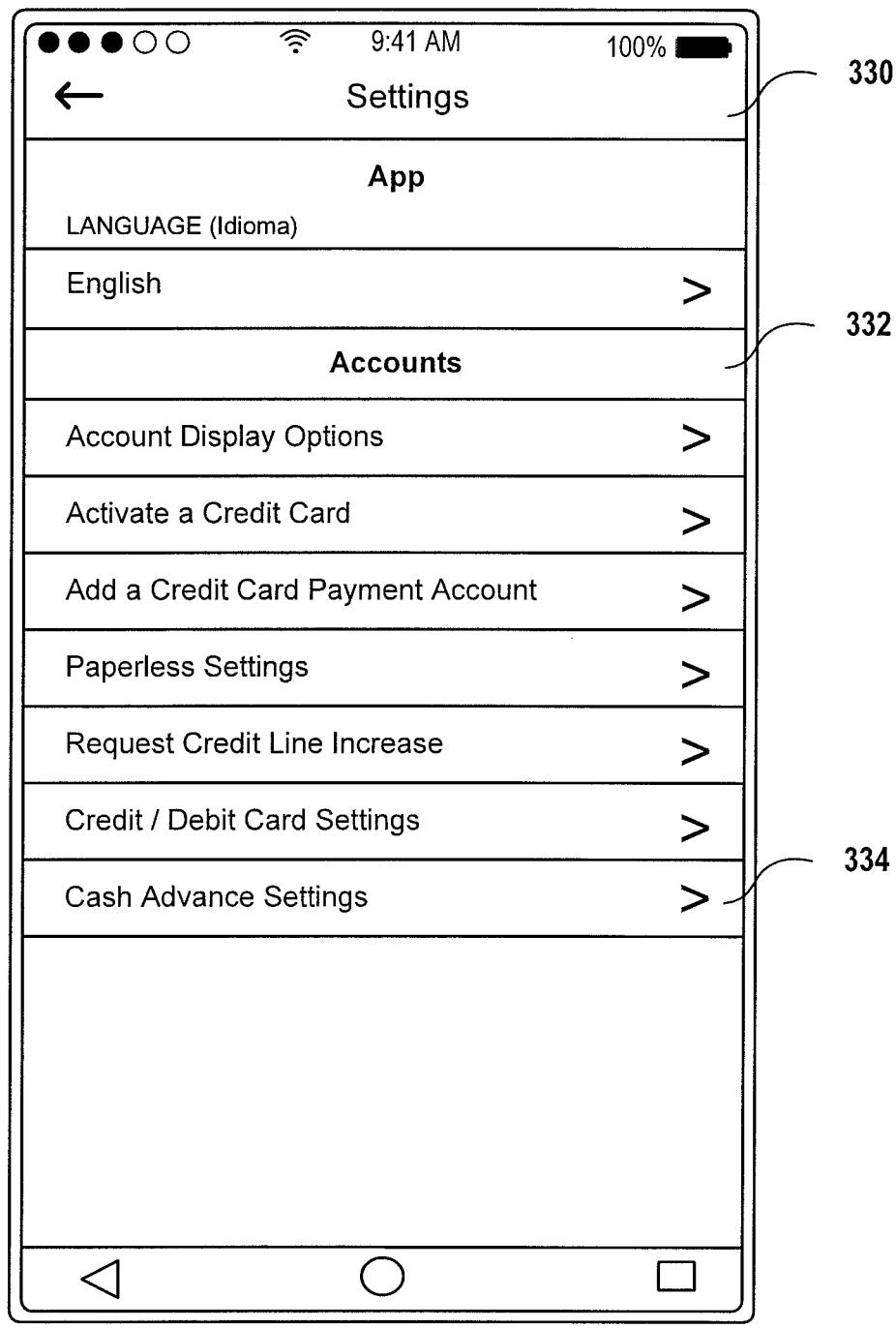

User 110 may select Settings 322 by clicking or touching the Settings option to access the Settings interface. An exemplary Settings interface 330 is shown in FIG. 3C. Settings interface 330 may include information such as interface language and various account settings or features 332, such as account display options, credit card activation, adding a payment account, paperless settings, requesting credit line increase, credit/debit card settings, and cash advance settings. Cash advance settings 334 may allow user 110 to manage the cash advance feature associated with a payment account of user 110.

Figure 3D:
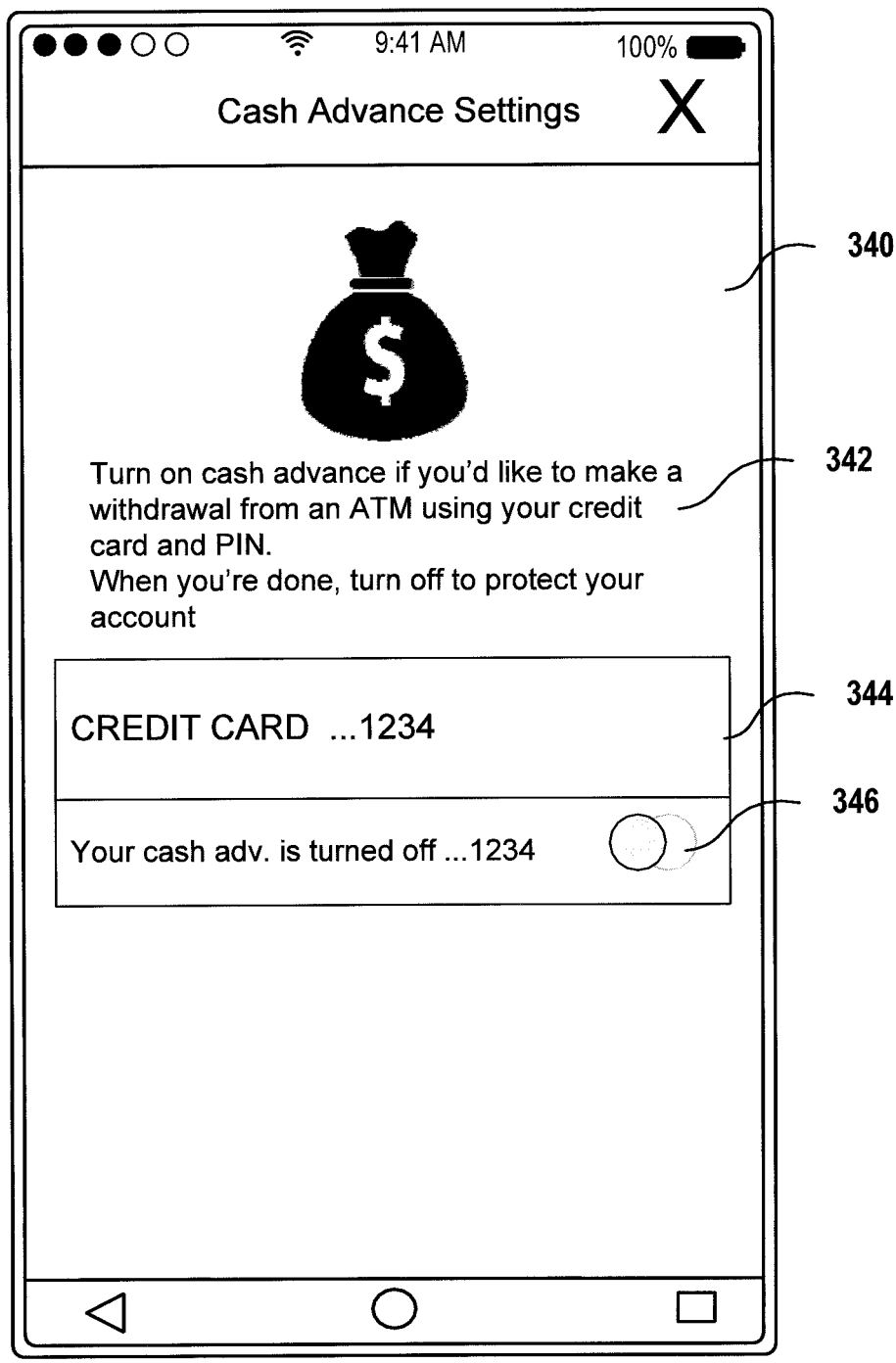

FIG. 3D shows an exemplary interface 340 allowing user 110 to manage the cash advance feature associated a payment account of the user. Interface 340 can be accessed by selecting the Cash Advance Settings menu item 334 in FIG. 3C. As shown in FIG. 3D, interface 340 is configured to display an instruction 342 and a cash advance management tool 344. In some embodiments, cash advance management tool 344 may correspond to a payment account of user 110. For example, FIG. 3D shows that cash advance management tool 344 corresponds to an identification number of a credit card account of user 110 ending with "1234." In some embodiments, cash advance management tool 344 may include a user selectable switch, such as switch 346, to receive user inputs to enable (also referred to as "turn on") and disable (also referred to as "turn off") the cash advance feature. Cash advance management tool 344 may also include an indication indicating the current status of the cash advance feature. For example, FIG. 3D shows that the cash advance feature is currently turned off or disabled. The indication can be provided through words (e.g., "Your cash adv. is turned off") or image(s) (e.g., switch 346 is at its off position), or a combination of words and image(s).

Figure 3E:
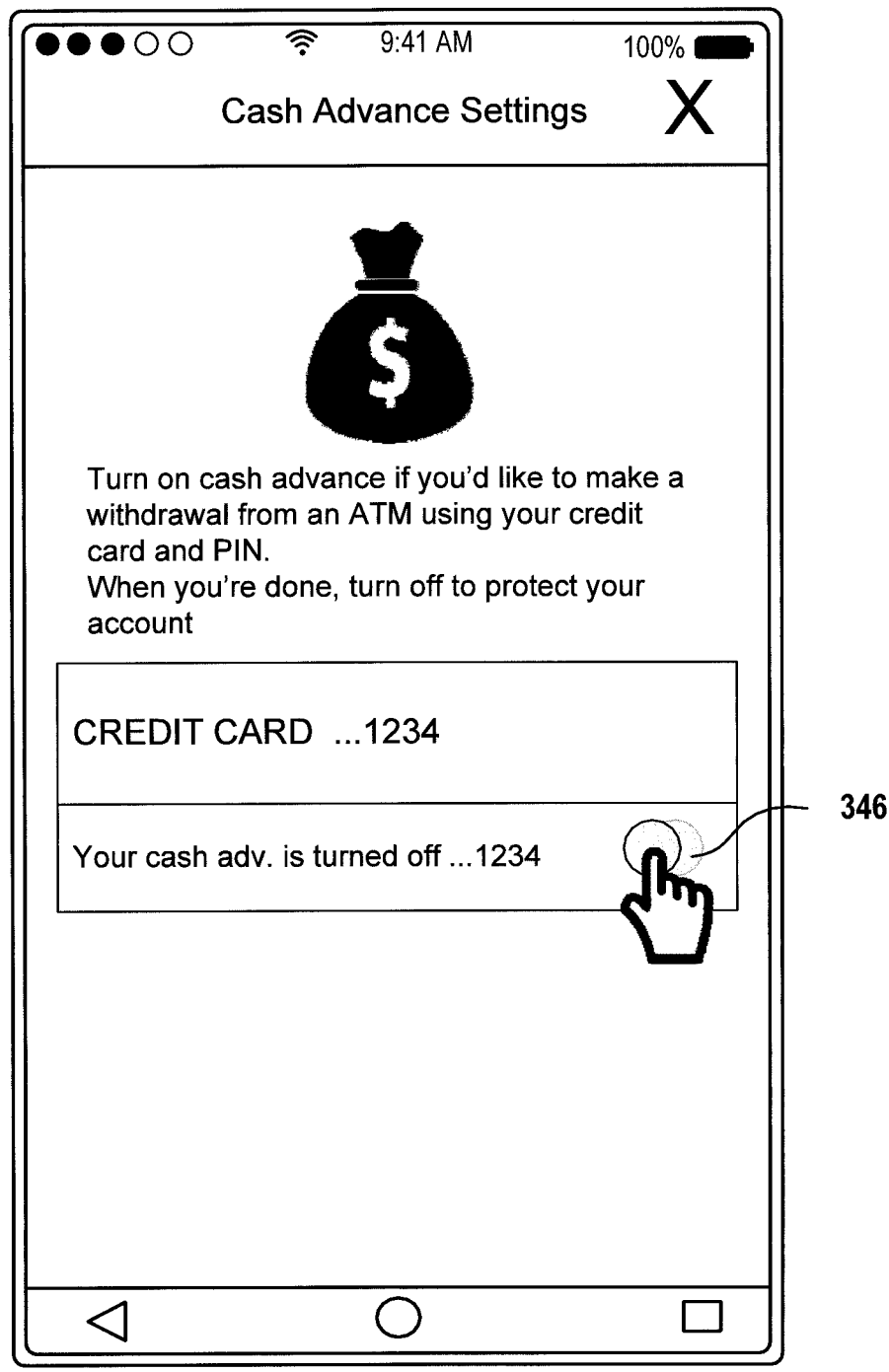

FIG. 3E shows an exemplary transitionary state in which user 110 is making a selection on switch 346 to turn on the cash advance feature, where the user action is represented by a hand-shaped cursor pointing to the switch 346.

Figure 3F:
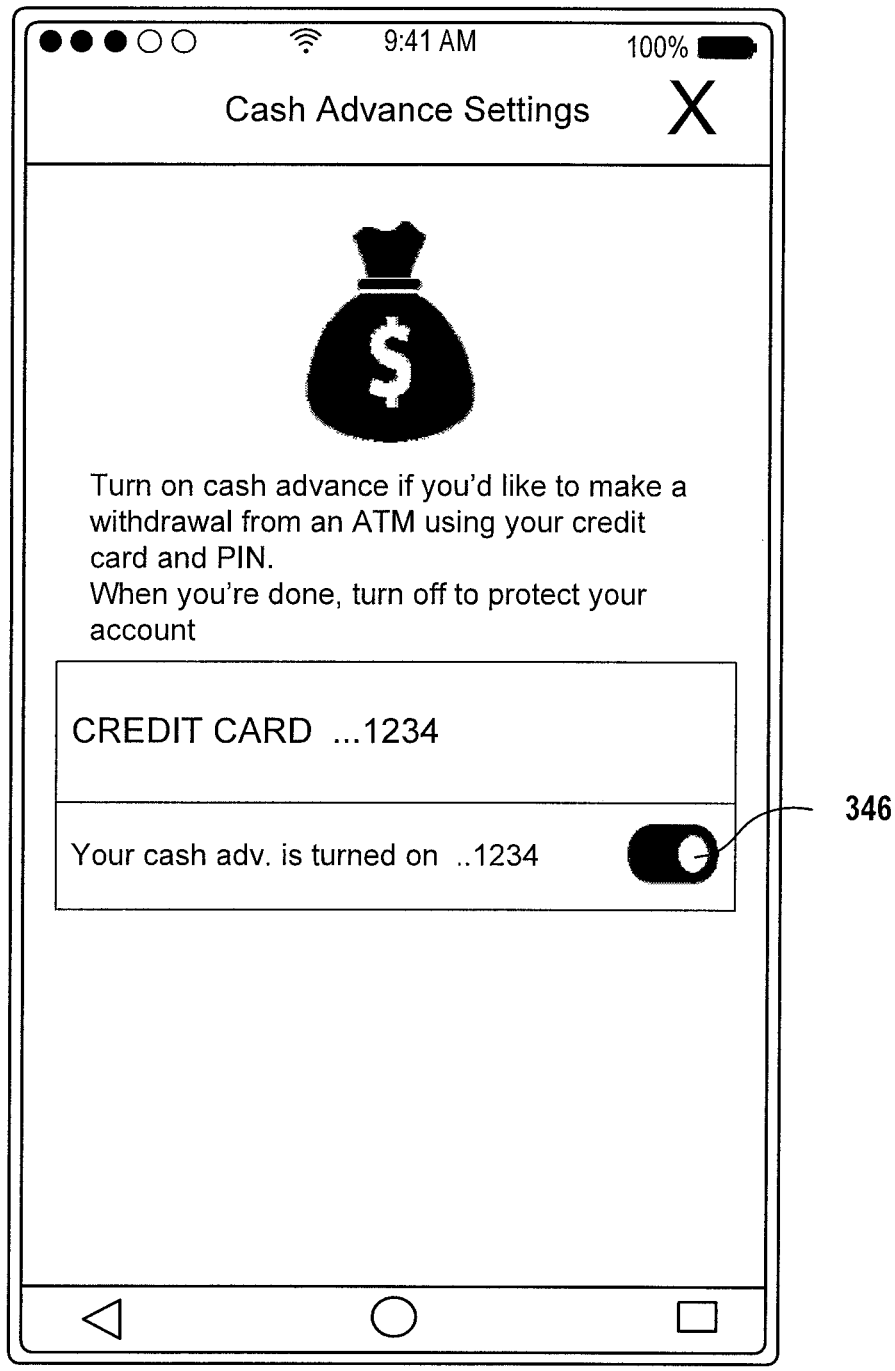

FIG. 3F shows an exemplary steady state after the user turns on the cash advance feature. As shown in FIG. 3F, the switch is now at its "ON" position, and the word indication reads "Your cash adv. is turned on."

Figure 3G:
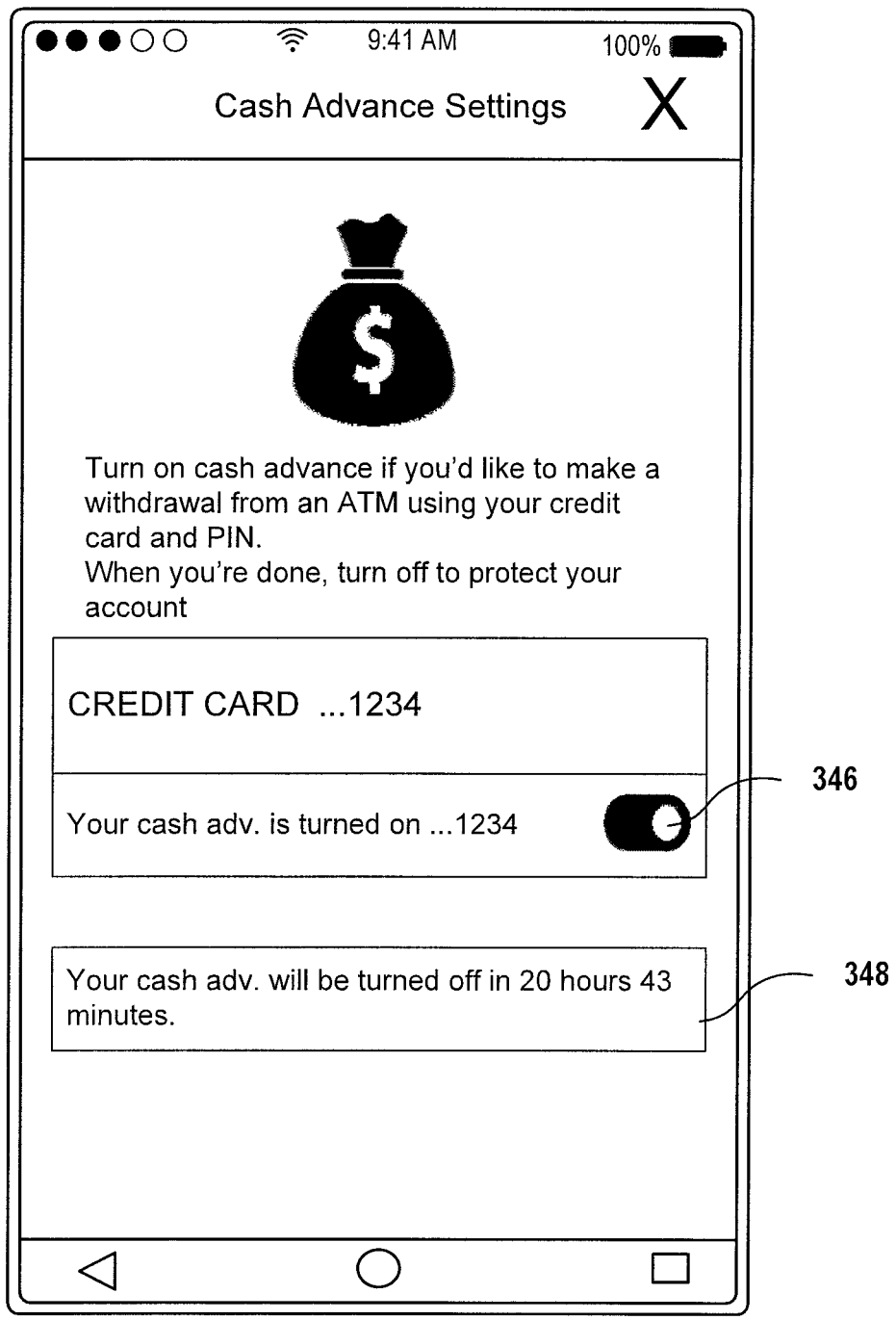

In some embodiments, the cash advance feature may be configurable to be turned on for a predetermined time period. For example, the predetermined time period can be specified by a number of minutes, a number of hours, or a combination of hours and minutes. A count-down timer may be initiated once the cash advance feature is turned on, and the remaining time in which the cash advance feature stays enabled may be provided to user 110 through user interface 300. FIG. 3G shows an exemplary implementation in which the remaining time 348 is displayed together with the switch 346. In some embodiments, the count-down timer may be maintained by one or more servers in the FSP system. The remaining time data may be downloaded from the server(s)

by user device 112 and synchronized with the count-down timer maintained at the server side.

Figure 4A:
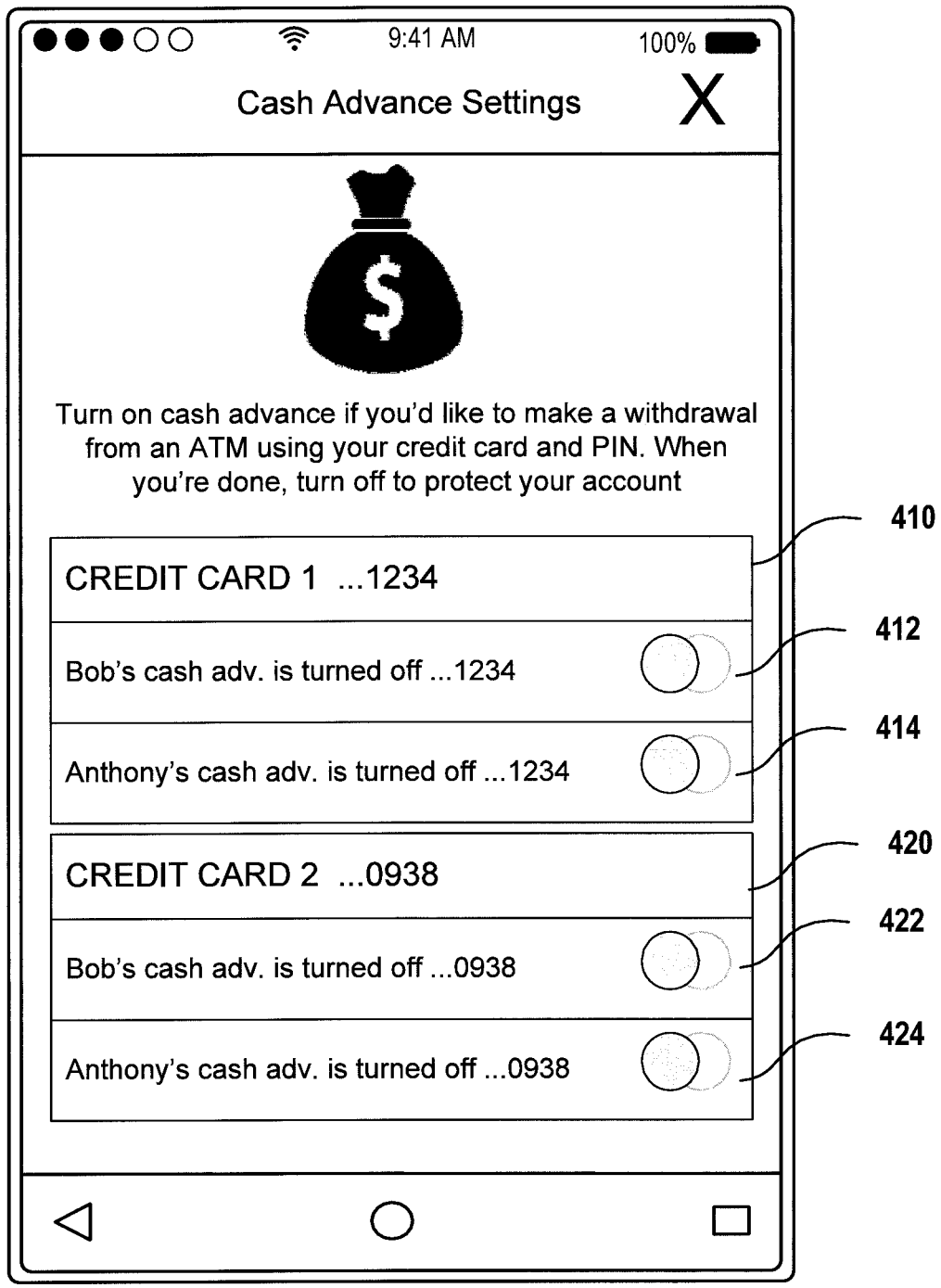
FIGS. 4A-4C are examples of another user device interface configured to receive user inputs to enable and disable a cash advance service, consistent with the disclosed embodiments.
Figure 4B:
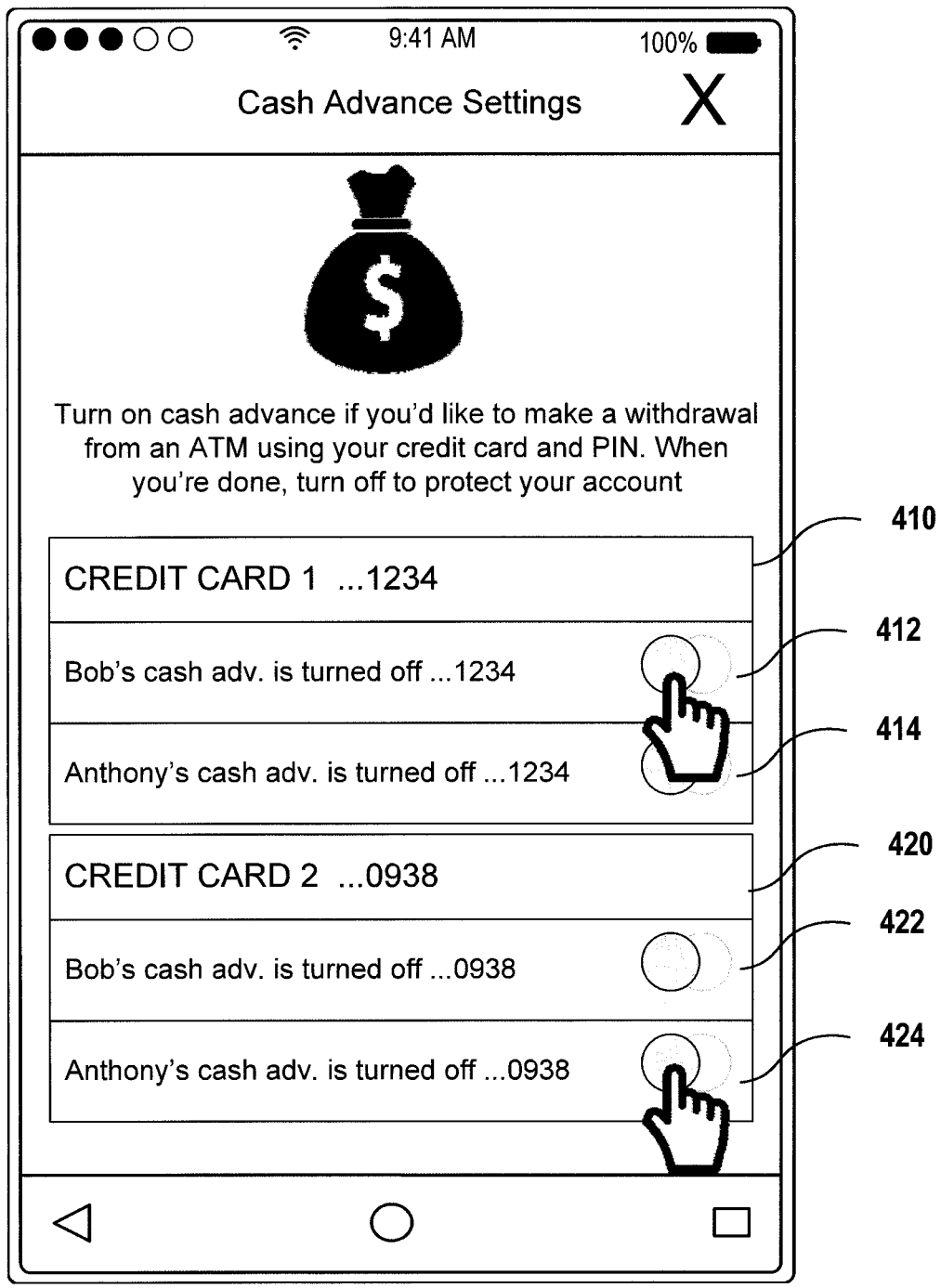
Figure 4C:
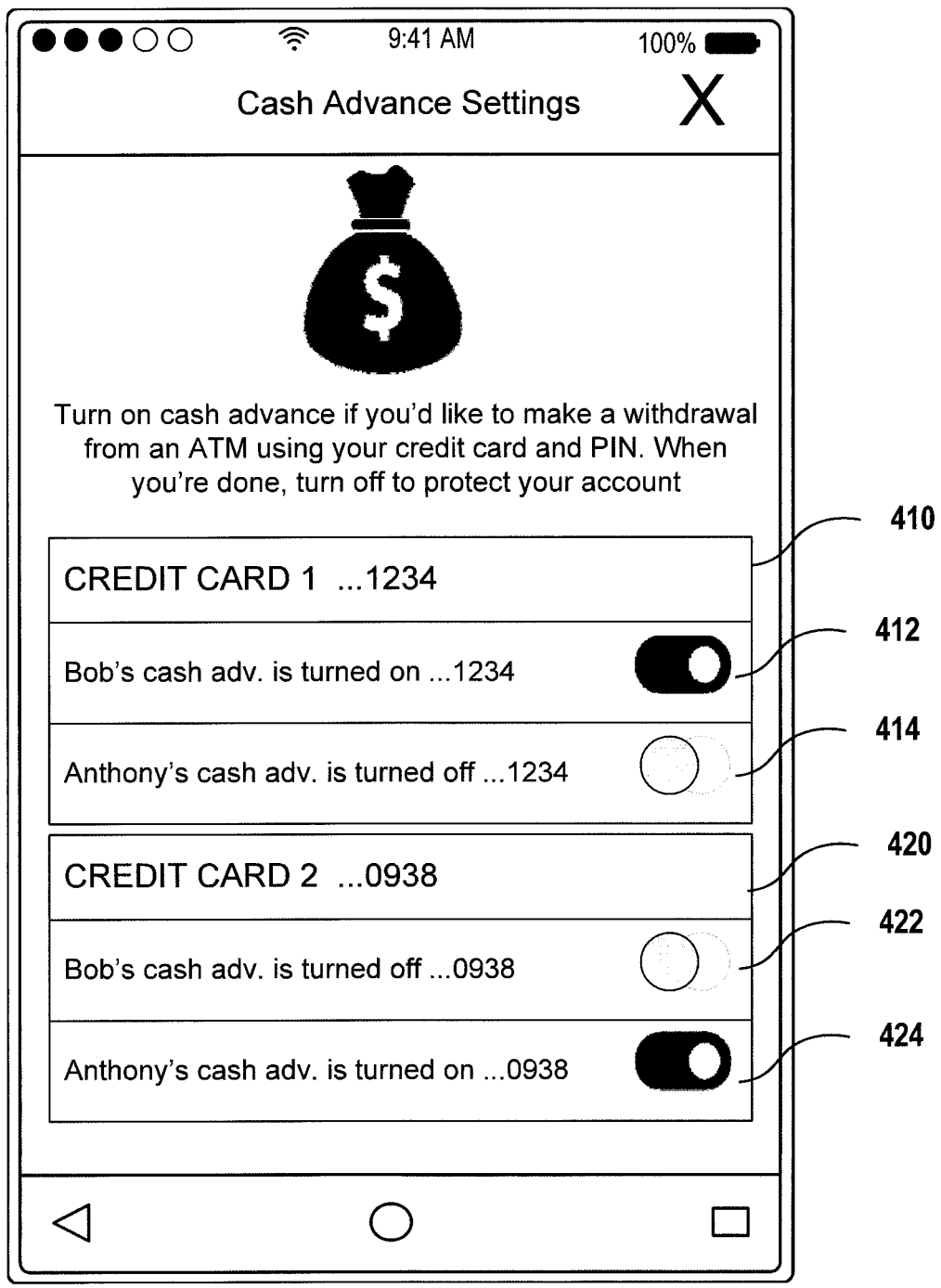

In some embodiments, the cash advance feature may be managed for multiple payment accounts and/or for multiple authorized users of each payment account. FIGS. 4A-4C shows an exemplary interface configured to receive user inputs to enable or disable the cash advance feature for individual payment accounts and/or individual authorized users. As shown in FIG. 4A, the Cash Advance Settings may include multiple cash advance management tools (e.g., 410 and 420), each corresponding to an individual payment account (e.g., credit card accounts having identification numbers respectively ending in "1234" and "0938"). In addition, a switch may be provided for each authorized user under each payment account. For example, for payment account 1 with an identification number ending in "1234," switch 412 may control an authorized user's cash advance setting (e.g., enabled or disabled), and switch 414 may control another authorized user's cash advance setting. Similarly, for payment account 2 with an identification number ending in "0938," switch 422 may control a first authorized user's cash advance setting, and switch 424 may control a second authorized user's cash advance setting.

FIG. 4B shows an exemplary interface in which user inputs are received to enable individual authorized user's cash advance feature. As shown in FIG. 4B, user inputs, indicated by hand-shaped cursors, are received to turn on the cash advance features for Bob's credit card account 1 and Anthony's credit card account 2. FIG. 4C shows an exemplary interface showing that the cash advance features are turned on for Bob's and Anthony's corresponding credit card accounts, indicated by the phrases proceeding their respective switches 412 and 424, both of which are at the "on" position.

Figure 5A:
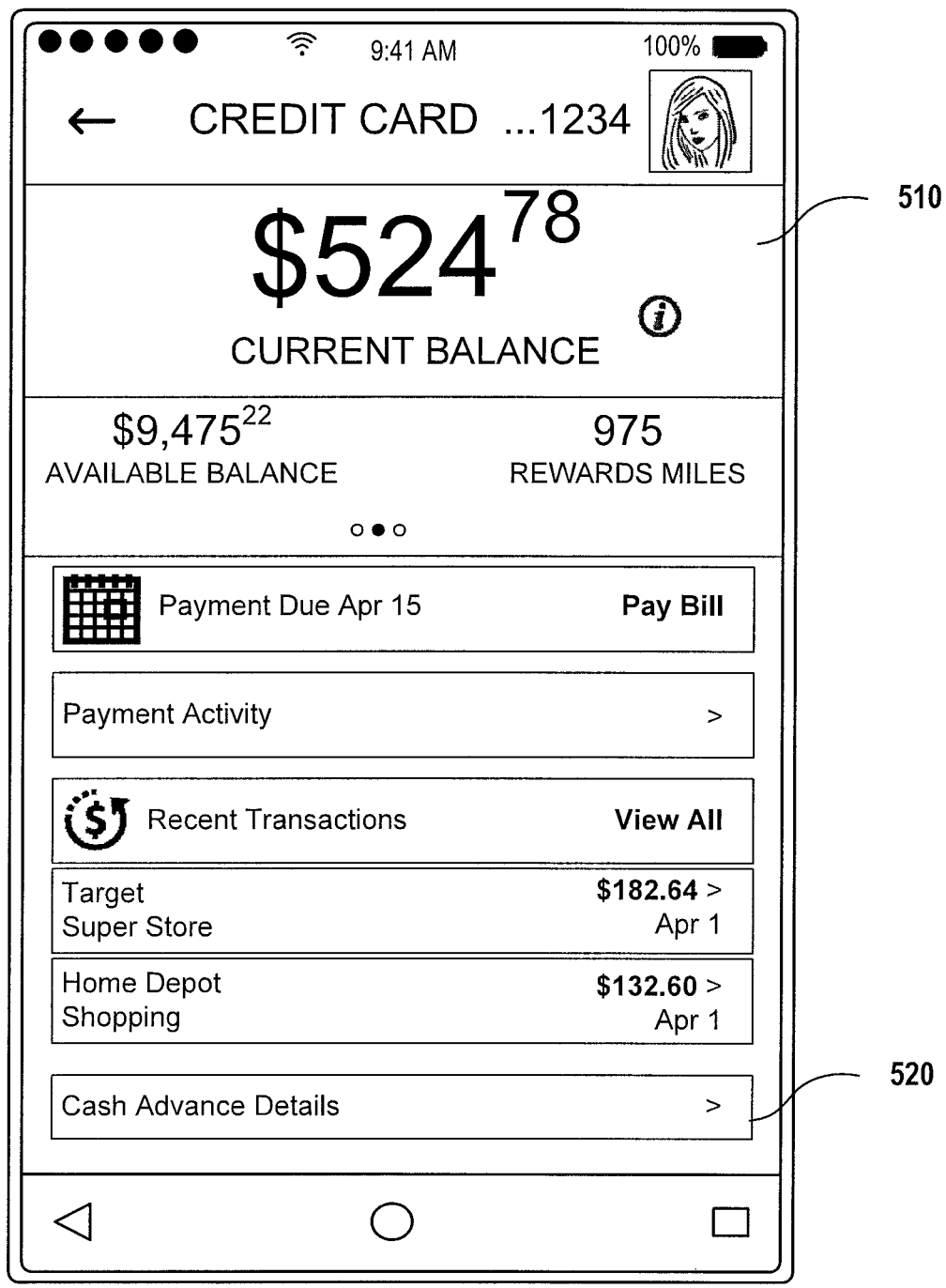
FIGS. 5A and 5B are examples of another user device interface configured to receive user inputs to enable and disable a cash advance service, consistent with the disclosed embodiments.
Figure 5B:
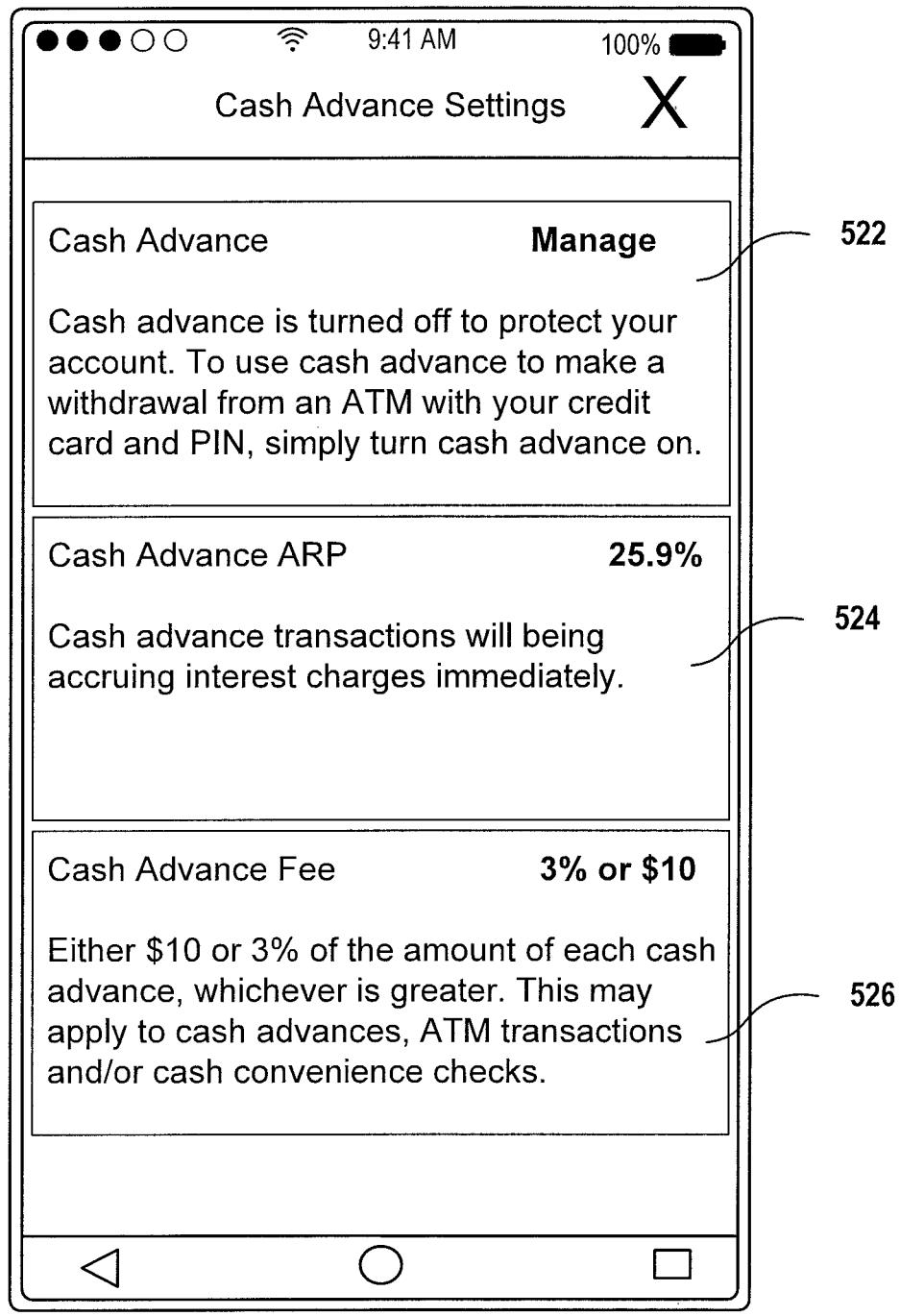

Cash advance settings can also be accessed through the user interface at an individual payment account level. FIG. 5A shows an exemplary interface 510 showing a Cash Advance Details menu option. In some embodiments, interface 510 may be accessed by selecting Credit Card menu option 312 shown in FIG. 3A. Returning to FIG. 5A, after receiving a user input to select the Cash Advance Details option 520, a Cash Advance Settings interface may be displayed, as shown in FIG. 5B.

In some embodiments, the cash advance feature may be disabled by default to reduce the risk of exposing a user's payment account to fraudulent activities. In this case, user 110 must turn on the cash advance feature before any cash advance transaction can be approved. If, for example, a cash advance transaction authorization request is received by FSP system 130 but FSP system 130 determines that the cash advance feature is not enabled, the cash advance transaction authorization request is declined. FSP system 130 may provide instructions to user device 112 to display an alert notifying user 110 that a cash advance request has been declined. In some embodiments, user 110 may be provided with the control option to turn on the cash advance feature after the initial cash advance request is declined.

Figure 6A:
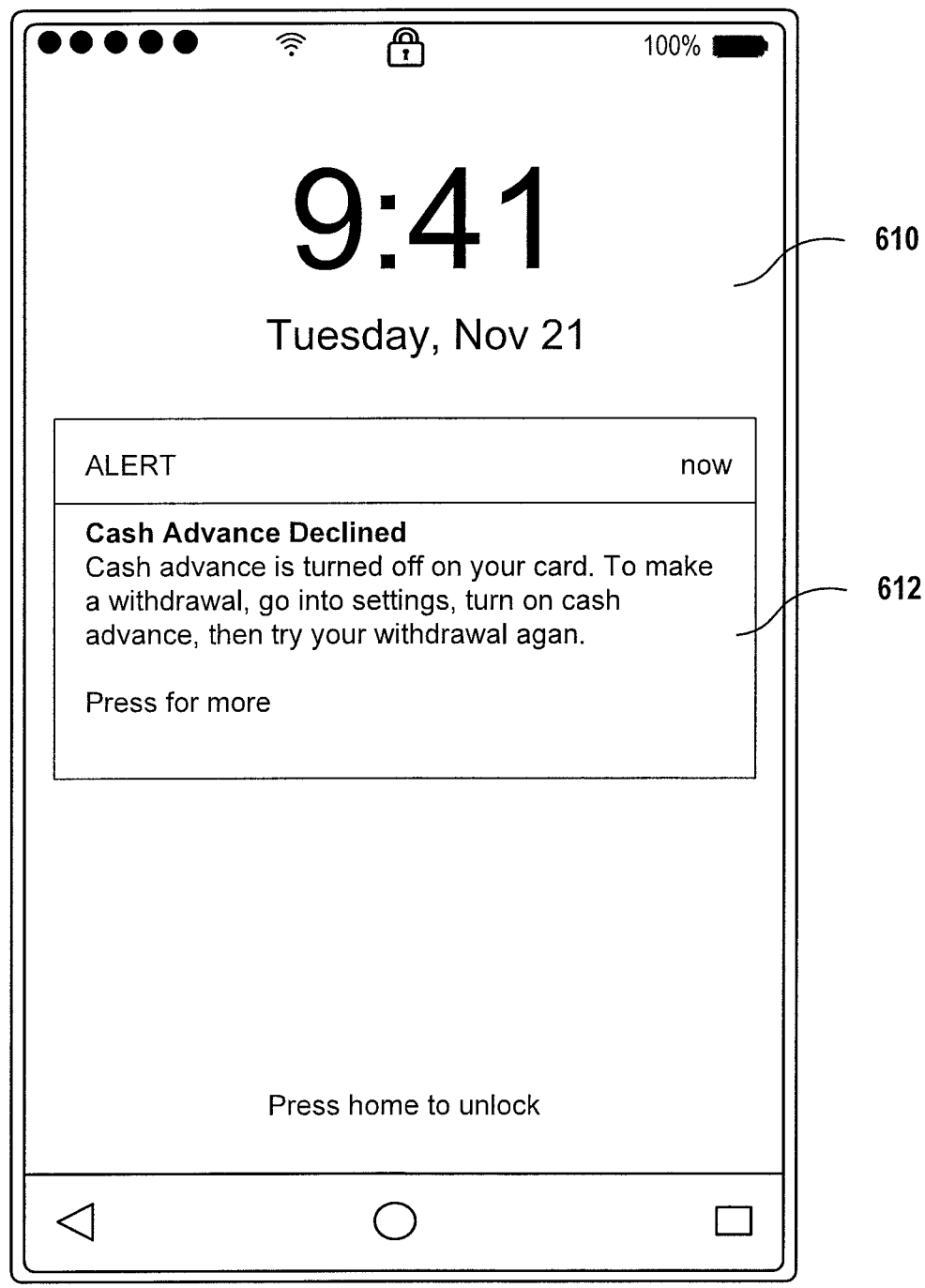
FIGS. 6A-6D are examples of another user device interface configured to receive user inputs to enable and disable a cash advance service, consistent with the disclosed embodiments.

FIGS. 6A-6D show exemplary user interfaces implementing the above-described alerting and controlling function. FIG. 6A shows an interface displaying an alert message 612 informing the user that a cash advance request is declined because the cash advance feature is turned off. In some embodiments, alert message 612 may be displayed on a lock screen 610 of user device 112, so that user 110 may receive the alert even if the user is not logged in to the mobile application of a website associated with the user's payment account. The user may be provided with a control option to turn on the cash advance feature by, for example, pressing the alert message, as shown in FIG. 6A. Specifically, after the user presses alert message 612, an interface shown in FIG. 6B may be displayed, in which a message 620 is provided to the user inquiring whether to turn on cash advance. The user may choose turn on the cash advance feature by pressing button 622, or keep the cash advance feature turned off by pressing button 624.

Figure 6B:
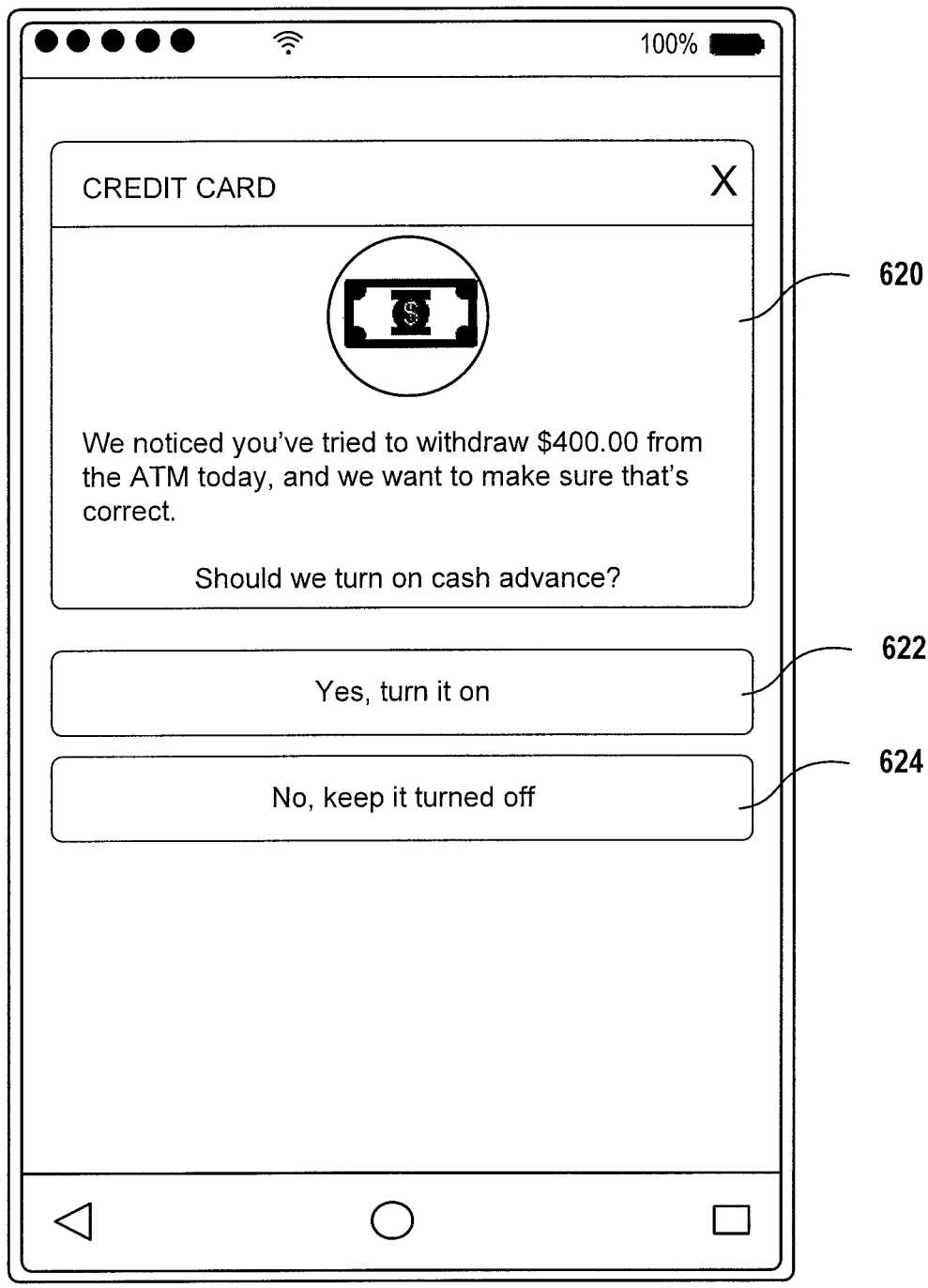
Figure 6C:
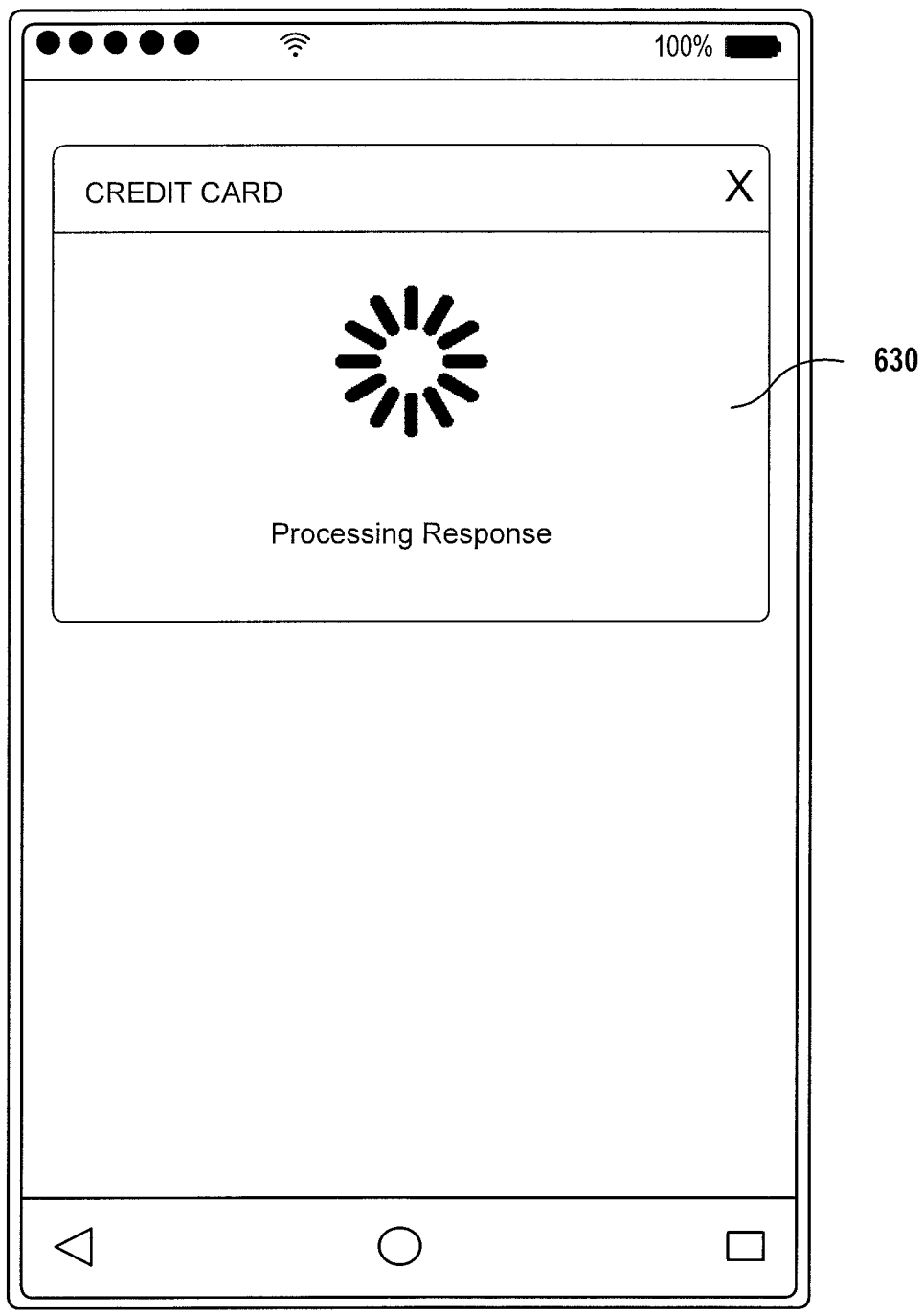
Figure 6D:
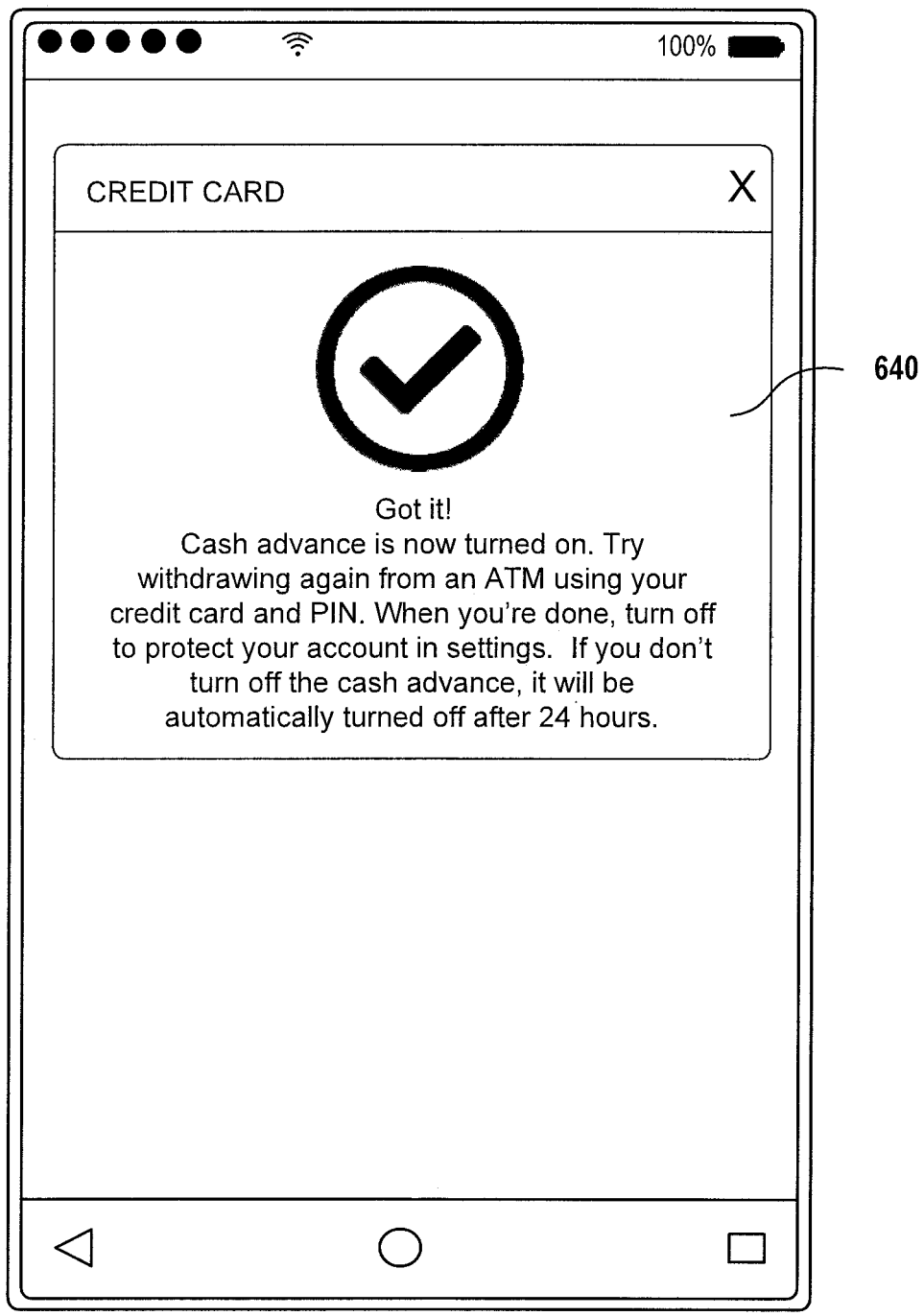

In some embodiments, the interface shown in FIG. 6B may be provided only after authentication of the user identity, for example, by verifying a password, a confidential graphical pattern, a fingerprint, a facial feature, etc. If the user selects button 622 to turn on the cash advance feature, an interface 630 shown in FIG. 6C may be displayed showing a message indicating that the request to enable cash advance feature is being processed.

Figure 7:
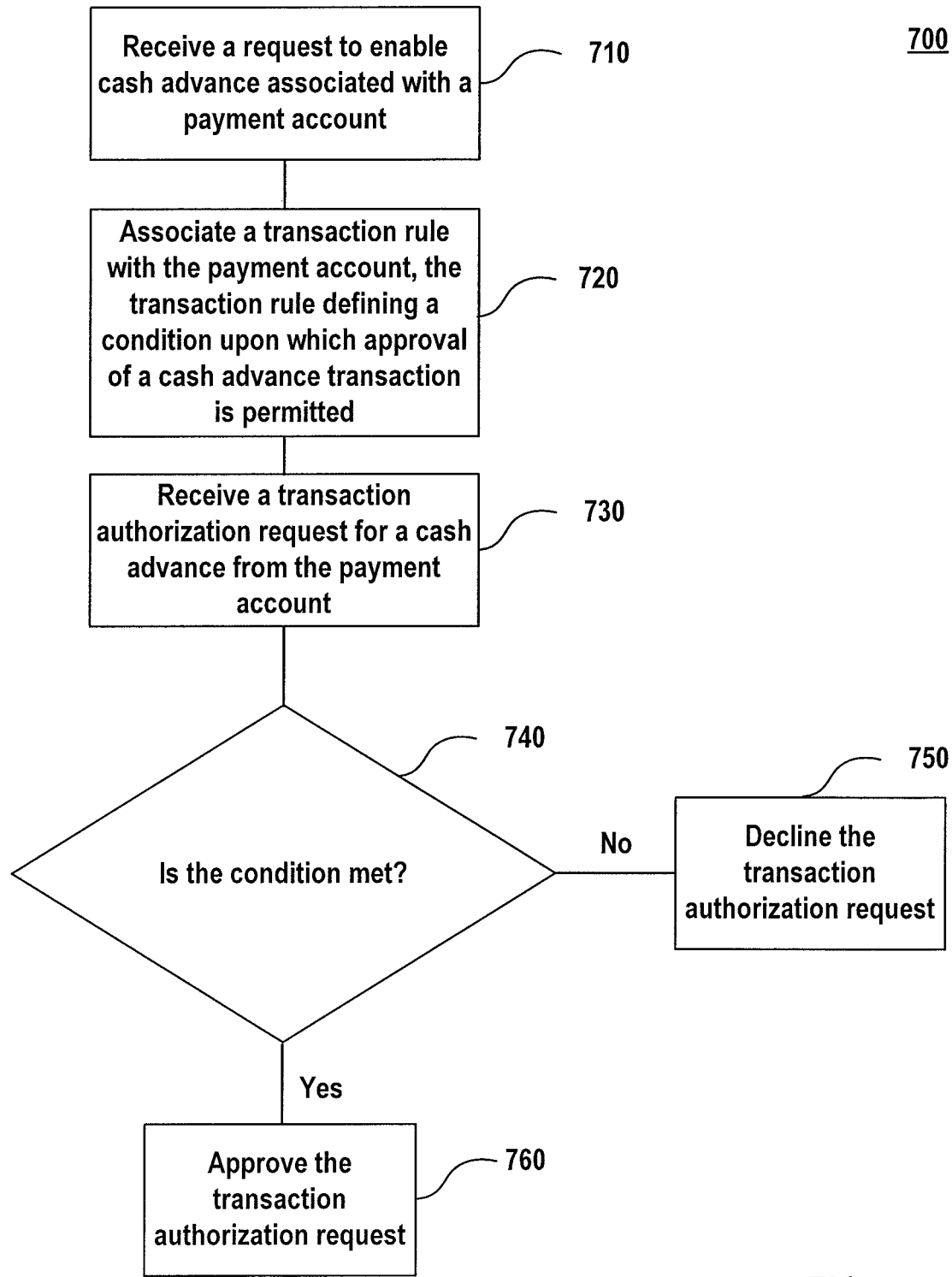
FIG. 7 is a flowchart of an exemplary process for managing a cash advance service, consistent with the disclosed embodiments.

FIG. 7 shows an exemplary process 700 for managing a cash advance service or feature associated with a payment account of a user, such as user 110. FSP system 130 may provide instructions to user device 112 to display an application interface, such as interface 340, for receiving user request to enable and disable the cash advance service. In step 710, FSP system 130 may receive a request to enable the cash advance service associate with the payment account. For example, user 110 may request a turn-on of the cash advance feature through user interface 340 (FIG. 3D) by switching the switch 346 to its on position. FSP system 130 may then receive the enable request from user device 112 through network 140 and/or transaction processing network 145.

After receiving the enable request, FSP system 130 may, in response to the request, associate a transaction rule with the user's payment account in step 720. The transaction rule may define a condition upon which approval of a cash advance transaction is permitted. For example, the condition may specify a window of time within with a cash advance transaction authorization request can be approved, and the condition is met when the cash advance transaction authorization request is received within the time window. In some embodiments, the time window may be specified by a timer, such as a count-down timer. In this case, the duration of the time window may be specified by the initial value of the timer, and the remaining time in which the cash advance service stays enabled can be measured by the current value of the timer. When the timer counts down to zero or within a predetermine range, the time window may be considered to be expired, which may indicate that the cash advance service is disabled, and subsequent cash advance requests may be declined. In some embodiments, the time window may be specified by an expiration time. In this case, the time window may be indicated by the expiration time. For example, when a user requests to enable the cash advance service, an expiration time may be set by which approval of a cash advance request can be permitted. When a cash advance transaction authorization request is received, FSA system 130 may determine the time point of receiving the cash advance transaction authorization request and compare the time point with the expiration time. FSA system 130 may determine that the condition is met when the cash advance transaction authorization request is received before and/or within a predetermined range of the expiration time, and that the condition is not met when the cash advance transaction authorization request is received after the expiration time.

In some embodiments, the timer and/or expiration time may be maintained by FSP system 130 for each payment account that has its cash advance feature enabled. Data indicative of the duration of the time window may be provided to user device 112 for displaying to user 110, as shown in message 348 of FIG. 3G. When a timer is used to measure the time window, the data provided to user device 112 may be synchronized with the timer.

In step 730, FSP system 130 may receive a transaction authorization request for a cash advance from the payment account. For example, a user may initiate a cash advance transaction at financial agency system 120, and a cash advance transaction authorization request may be received by FSP system 130 through transaction processing network 145 and/or network 140.

After receiving the cash advance transaction authorization request, FSP system 130, in step 740, may determine if the condition defined in the transaction rule associated with the payment account is met. For example, FSP system 130 may check if the time window allowing cash advance transactions has expired. When the time window is specified by a timer, FSP system 130 may check whether the timer has counted down to zero or is within a predetermined range (e.g., a preset range within which the time window is considered to be expired). When the time window is specified by an expiration time, FSP system 130 may check if the cash advance transaction authorization request is received after the expiration time.

In step 760, when the time window is not expired, indicating that the cash advance service is enabled, FSP system 130 may approve the cash advance transaction authorization request by, for example, transmitting an approval response to the financial agency system 120. If, however, the time window has expired, indicating that the cash advance service is disabled, FSP system 130 may decline the cash advance transaction authorization request by, for example, transmitting a declining response to the financial agency system 120, as shown in step 750.

The transaction rule may define various different conditions to manage the cash advance feature. For example, the condition may be a binary condition specifying whether the cash advance feature is enable or disabled, which can be controlled by user 110 through an application interface display on user device 112. In another example, the condition may specify additional criteria for approving a cash advance transaction. Such additional criteria may include a time-based condition (e.g., time window), a location-based condition (e.g., whether the transaction is initiated within a defined geographical area), and the like. The condition may be reset after a single cash advance transaction is approved (e.g., forcing the condition not to be met for subsequent cash advance transactions) or may stay valid for the entire specified time duration such that multiple cash advance transactions may be approved.

Figure 8A:
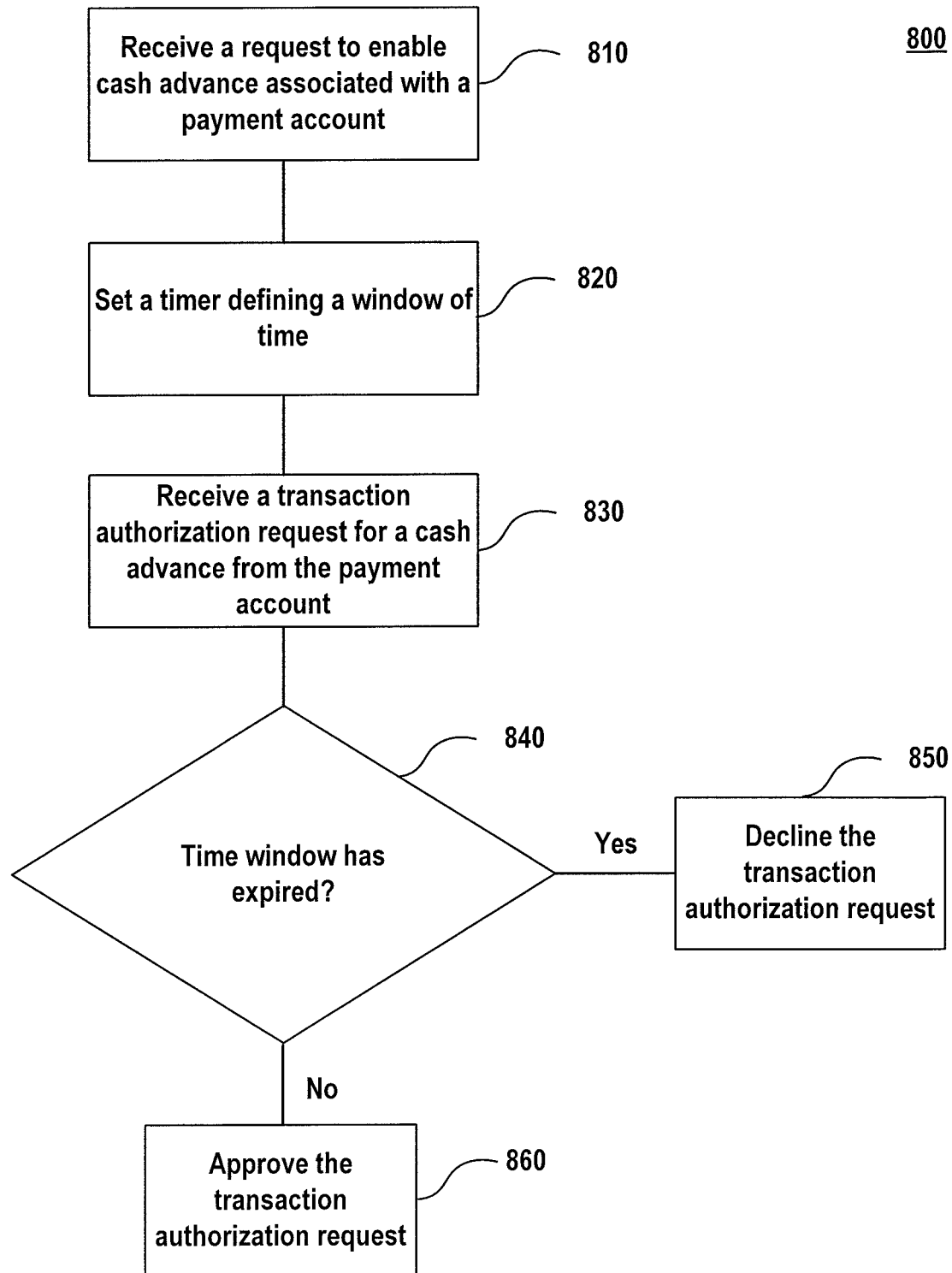
FIG. 8A is a flowchart of another exemplary process for managing a cash advance service, consistent with the disclosed embodiments.

FIG. 8A is a flow chart of an exemplary process 800 utilizing a time window and timer as the condition to manage the cash advance service. In step 810, FSP system 130 may receive a request to enable cash advance service associated with a payment account of a user, such as user 110. Step 810 is similar to step 710. In step 820, FSP system 130 may set a timer defining a time window within which approval of cash advance transactions are permitted. The timer may be set to be counting down from a predetermined initial value, such as 24 hours, 12 hours, 2 hours 30 minutes, 45 minutes, or any other values. The duration of the time window may also be set by user 110 through, for example, an application interface displayed on user device 112. Once set, the timer may start counting down. The initial and/or remaining time duration may be provided to synchronized with user device 112 through network 140 such that user 110 may be informed of the remaining time window for conducting a cash advance transaction. An exemplary implementation of the remaining time display is provided as a message 348 shown in FIG. 3G. FSP system 130 may also provide instructions to user device 112 for displaying an indication of whether the cash advance service is enabled or disabled, such as displaying the cash advance switch 346 in its on position and/or the message proceeding the switch, as shown in FIG. 3G.

In step 830, FSP system 130 may receive a cash advance transaction authorization request, similar to step 730. In step 840, FSP system 130 may determine if the time window has expired, indicating whether the cash advance service is enabled (e.g., when the time window does not expire) or disabled (e.g., when the time window expires). For example, FSP system 130 may check the timer and determine if the timer has counted down to zero or is within a predetermine range of expiration of the time window. In one implementation, a timer may be represented by a count-down number, indicating the remaining number of hours and/or minutes before the time window expires. FSP system 130 may compare the count-down number with zero. If the count-down number is not zero, then it indicates that the cash advance service remains enabled. Otherwise, it indicates that the cash advance service is disabled. When user 110 requests enabling of the cash advance service, FSP system 130 may set the count-down number to a predetermined value, or a user-defined value, and start the counting down. When user 110 requests disabling the cash advance service, FSP system 130 may reset the count-down number to zero. In this case, the value of the count-down number may be used as an indication of whether the cash advance service is enabled or disabled. Managing the cash advance service may be achieved by controlling or modifying the count-down number associated with the payment account.

In step 840, after FSP system 130 makes a determination as to whether the time window has expired, FSP system 130 may, in step 860, approve the cash advance transaction authorization request when the time window has not expired, or, in step 850, decline the cash advance transaction authorization request when the time window has expired.

Figure 8B:
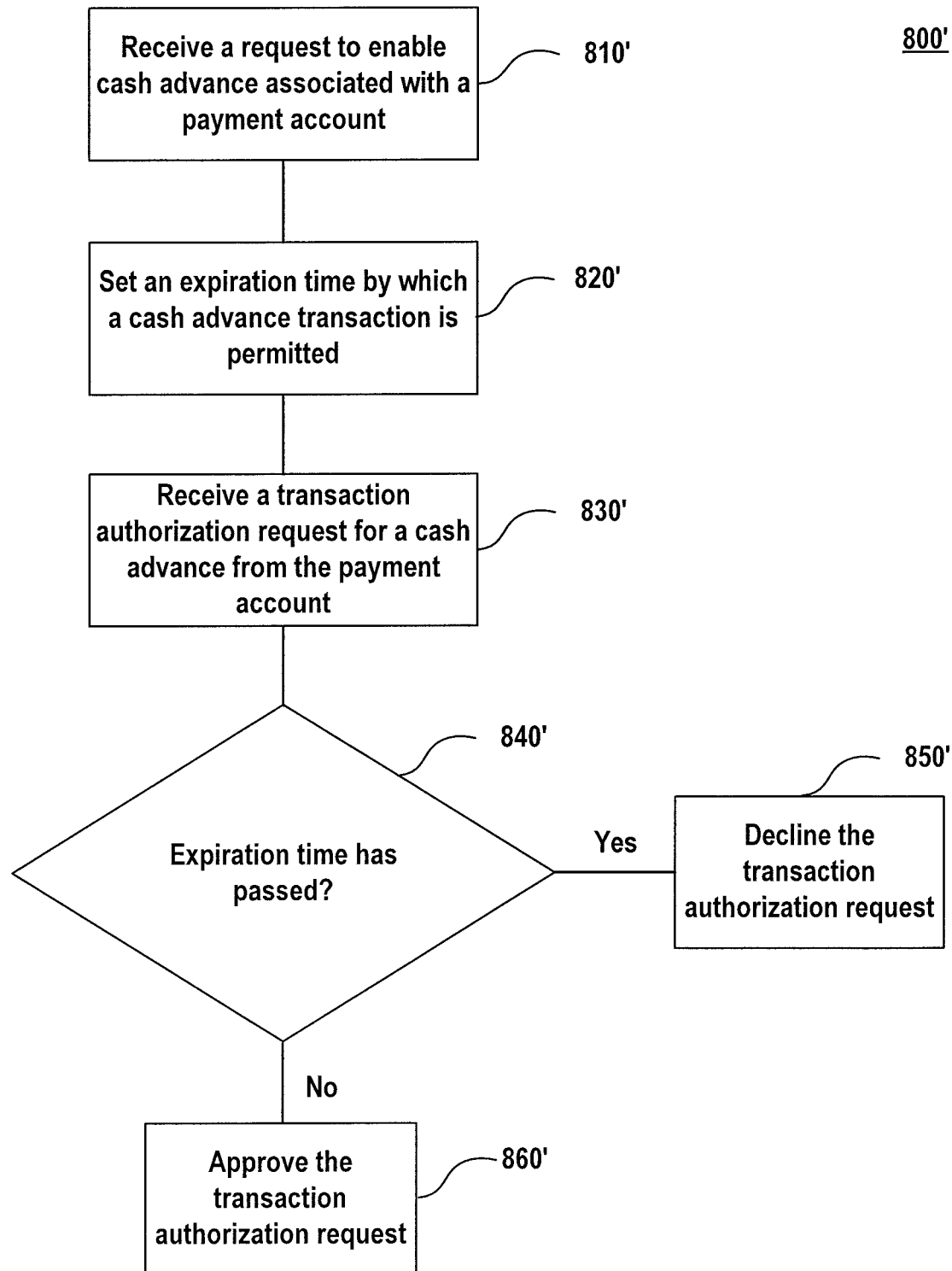
FIG. 8B is a flowchart of another exemplary process for managing a cash advance service, consistent with the disclosed embodiments.

FIG. 8B is a flow chart of another exemplary process 800' utilizing an expiration time as the condition to manage the cash advance service. In step 810', FSP system 130 may receive a request to enable cash advance service associated with a payment account of a user, such as user 110. Step 810' is similar to step 810. In step 820', FSP system 130 may set an expiration time by which a cash advance transaction is permitted. The expiration time may be a time point specified in at least one of date, hour, minute, and second. For example, an expiration time may be specified as May 1, 2018 at 6:00 PM Eastern Time. In another example, an expiration time may be specified as Jun. 2, 2018. The expiration time may be used to indicate, for example, the latest time by which a cash advance transaction is permitted. The expiration time may be associated with the payment account and may be set or reset based on user request. For example, user 110 may request to enable cash advance service at time t in step 810', and FSP system 130 may set the expiration time at t+w, where w is a predetermined time window. In another example, user 110 may specify the time window w to be, for example, 30 minutes, 24 hours, 1 week, etc. FSP system 130 may then set the expiration time accordingly.

In step 830', FSP system 130 may receive a cash advance transaction authorization request, similar to step 830. In step 840', FSP system 130 may determine if the expiration time has passed. For example, FSP system 130 may compare the time point at which the cash advance transaction authorization request is received and the expiration time. If the cash advance transaction authorization request is received after the expiration time, then FSP system 130 may determine that the expiration time has passed. Otherwise, FSP system 130 may determine that the expiration time has not passed. In another example, FSP system 130 may compare a current time (not necessarily the time of receiving the cash advance transaction authorization request) with the expiration time. If the current time is later than the expiration time, then FSP system 130 may determine that the expiration time has passed. Otherwise, FSP system 130 may determine that the expiration time has not passed. FSP system 130 may also compare other types of time associated with or relating to the cash advance transaction authorization request for determining if the expiration time has passed.

In step 840', after FSP system 130 makes a determination as to whether the expiration time has passed, FSP system 130 may, in step 860', approve the cash advance transaction authorization request when the expiration time has not passed, or, in step 850', decline the cash advance transaction authorization request when the expiration time has passed.

Figure 9A:
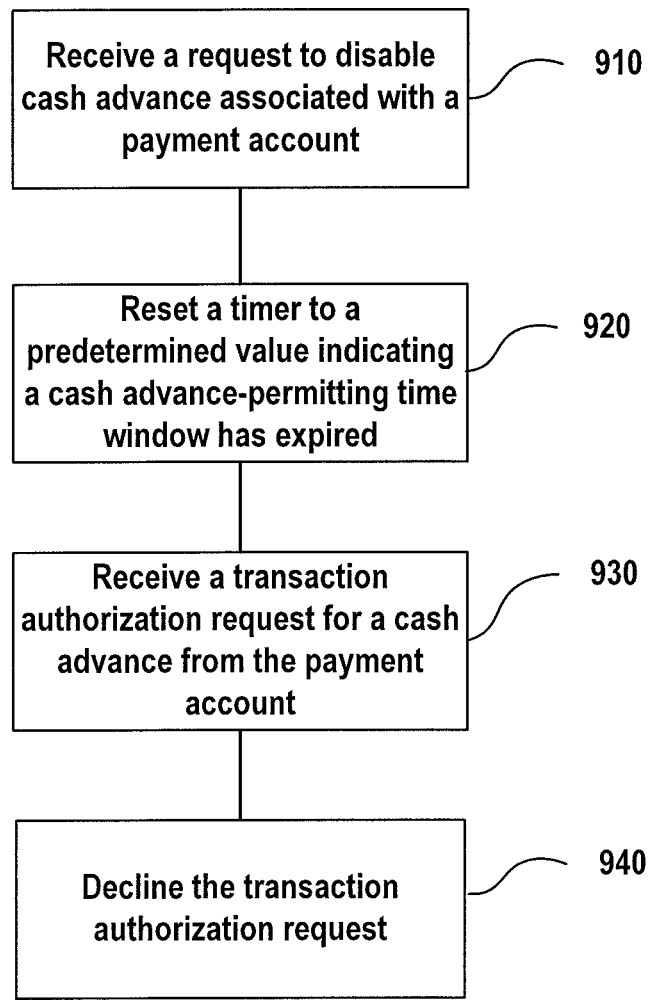
FIG. 9A is a flowchart of an exemplary process for disabling a cash advance service, consistent with the disclosed embodiments.

FIG. 9A is a flow chart of an exemplary process 900 of disabling the cash advance service. In step 910, FSP system 130 may receive a request to disable a cash advance service associated with a payment account. For example, user 110 may switch the cash advance control switch 346 shown in FIGS. 3D-3F into its OFF position to request disabling the cash advance service. FSP system 130 may receive the user request from user device 112 through network 140 and, in response, disable the cash advance service.

The cash advance service may be implemented in connection with a countdown timer representing a cash advance-permitting time window. So long as the timer has a non-zero value, the window is considered to be "open," and the cash advance feature is enabled. However, when the timer counts down to zero, the window is "closed" and the cash advance service becomes disabled. In some embodiments, any suitable "cut-off" value, instead of zero, or any value within a predetermined range, may be used as the indication that the window is "closed" and the cash advance service becomes disabled. Thus, in one implementation, in step 920 FSP system 130 may disable the cash advance service by setting or resetting the value of the countdown timer to zero or any predetermined value indicating that the cash advance-permitting time window is "closed" and the cash advance service becomes disabled.

In step 930, FSP system may receive a transaction authorization request for a cash advance from the payment account, similar to steps 730 and 830. Because the value of the timer has been set to zero (or a predetermined value indicating that the cash advance-permitting time window is "closed") in step 920, the time window is closed, and the cash advance service is therefore disabled. Thus, at step 940, FSP system 130 may decline the cash advance transaction authorization request.

In some embodiments, the cash advance feature may be disabled by default. For example, FSP system 130 may, by default, set the timer to zero thus disabling the cash advance service. As a result, unless user 110 first requests enabling of the cash advance service, any cash advance transaction will be declined. This may improve the security of the payment account and reduce potential fraudulent activities.

Figure 9B:
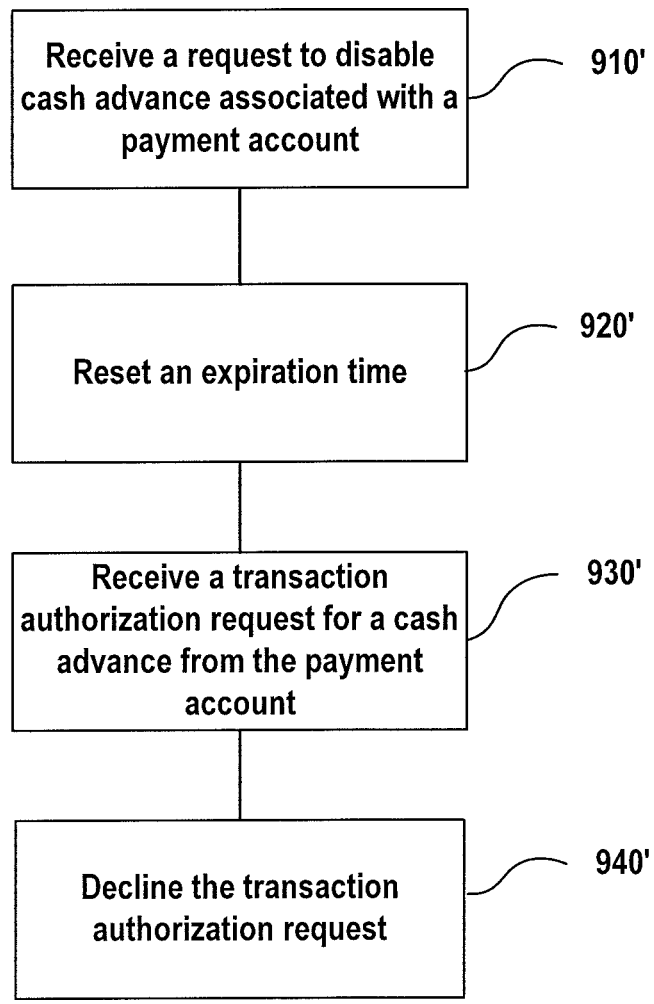
FIG. 9B is a flowchart of another exemplary process for disabling a cash advance service, consistent with the disclosed embodiments.

FIG. 9B is a flow chart of another exemplary method 900' of disabling the cash advance service. In step 910', FSP system 130 may receive a request to disable a cash advance service associated with a payment account, similar to step 910. In step 920', FSP system 130 may reset an expiration time associated with the payment account. As discussed above, the expiration time may specify the latest time by which a cash advance transaction is permitted. By resetting the expiration time, FSP system 130 may disallow subsequent cash advance transactions. For example, FSP system 130 may reset the expiration time to the current time or any time prior to the current time. In this way, any subsequent cash advance transactions may be automatically declined according to, for example, the determination of step 840'. In another example, the expiration time may be reset to a predetermined value, such as 0, or any other value that indicates the expiration time has passed.

In step 930', FSP system may receive a transaction authorization request for a cash advance from the payment account, similar to step 930. Because the expiration time has been reset in step 920', the expiration time has passed, and the cash advance service is therefore disabled. Thus, at step 940', FSP system 130 may decline the cash advance transaction authorization request.

Figure 10:
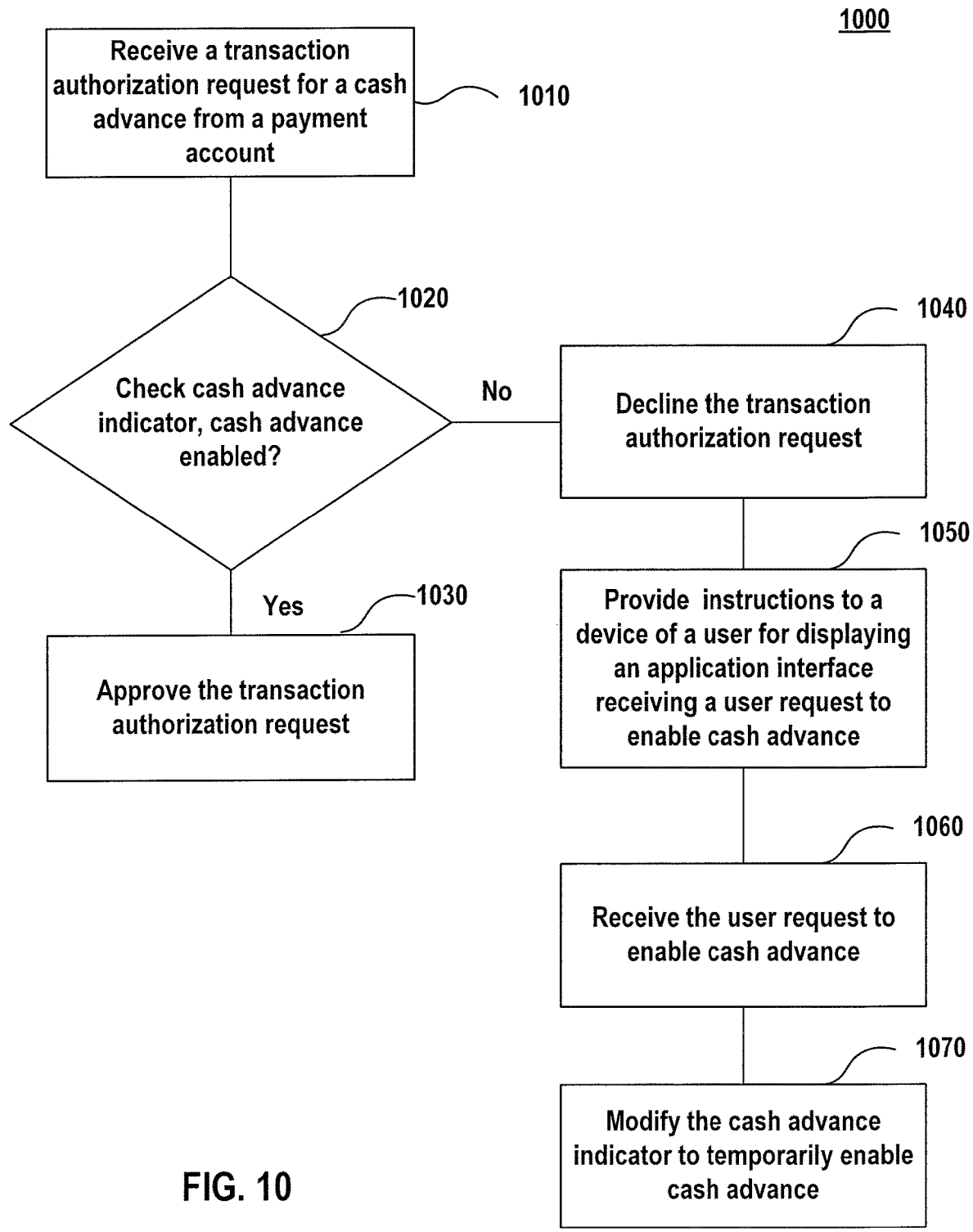
FIG. 10 is a flowchart of an exemplary process for temporarily enabling a cash advance feature, consistent with the disclosed embodiments.

FIG. 10 is a flow chart of an exemplary method 1000 for temporarily enabling a cash advance feature associated with a payment account of a user, such as user 110. In step 1010, FSP system 130 may receive a transaction authorization request for a cash advance from a payment account, similar to steps 730 and 830. In step 1020, FSP system 130 may check a cash advance indicator to determine whether the cash advance feature is enabled. In some embodiments, the cash advance indicator may include a binary indicator that can be controlled by user 110 using user device 112. In some embodiments, the cash advance indicator may include a time window indicating the remaining time in which the cash advance feature stay enabled. For example, the time window may be specified by a count-down timer, as discussed above. FSP system 130 may determine whether the cash advance feature is enabled, based on the state or value of the cash advance indicator. Based on the determination, FSP system 130 may approve the cash advance transaction authorization request when it is determined that the cash advance feature is enabled, in step 1030. Otherwise, FSP system 130 may decline the cash advance transaction authorization request when it is determined that the cash advance feature is disabled, in step 1040.

After FSP system 130 declines the cash advance transaction authorization request in step 1040, method 1000 may proceed to step 1050, in which FSP system 130 may provide instruction to user device 112 for displaying an application interface (e.g., interfaces shown in FIGS. 6A-6D). The application interface may be configured to receive a user request to enable the cash advance feature (e.g., button 622 shown in FIG. 6B). User 110 may select to enable the cash advance feature through the application interface (e.g., by pressing button 622). In step 1060, FSP system 130 may receive the user request to enable the cash advance feature, similar to steps 710 and 810. In step 1070, FSP system 130 may modify the cash advance indicator to temporality enable the cash advance feature. For example, the cash advance indicator may include a timer specifying the time window during which the cash advance feature is enabled, as discussed above. FSP system 130 may modify the timer by, for example, setting the timer to a predetermined or user-defined initial count-down value, thereby temporarily enabling the cash advance feature before the timer counts down to zero.

The above described processes may be implemented as a computer program or application or as a plugin module or sub component of another application. Some of the described processes may be executed by a computing system 200 of FSP system 130, financial agency system 120, user device 112 or other system provided as part of payment processing network 145. The described techniques may be varied and are not limited to the examples or descriptions provided.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity performing the transaction authorization methods, it is to be understood that consistent with disclosed embodiments another entity provided as part of payment processing network 145, for example, may provide such services in conjunction with or separate from a financial service provider. In some embodiments, a financial service provider may provide the disclosed account information, time-related information and transaction rules as part of a database accessible to payment processing network 145.

The claims are to be interpreted broadly based on the language employed in the claims and not limited to examples described in the present specification, which are non-exclusive. For example, aspects of the disclosed embodiments are described as being associated with data stored in memory, and one skilled in the art will appreciate that these aspects can be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

The invention claimed is:

1. A system for managing a cash advance service associated with a payment account of a user, the system comprising:
   one or more memory devices storing instructions; and
   one or more processors configured to execute the instructions to perform operations comprising:
      receiving a first cash advance transaction authorization request from a computing device associated with the payment account;
      determining, responsive to the cash advance transaction authorization request, whether a cash advance service is enabled,
      responsive to a determination that the cash advance service is not enabled, declining the cash advance transaction authorization request and providing, to a device of the user, instructions to display an application interface, the application interface receiving user requests to enable and disable the cash advance service;
      receiving, through the application interface, a request to enable the cash advance service;
      in response to the request to enable the cash advance service, associating a transaction rule with the payment account, the transaction rule defining a condition upon which approval of a cash advance transaction is permitted, the condition specifying a window of time;
      receiving a second cash advance transaction authorization request from a computing device associated with the payment account;
      temporarily enabling the cash advance service;
      determining, responsive to the second cash advance transaction authorization request, whether the transaction rule is satisfied, the transaction rule being satisfied when the cash advance transaction authorization request is received before an expiration of the window of time, the window of time being a predetermined duration;
      approving the second advance transaction authorization request when the transaction rule is satisfied;
      declining the second cash advance transaction authorization request when the transaction rule is not satisfied;
      transmitting the determination to the computing device; and
      reverting the cash advance service to a default setting.

2. The system of claim 1, wherein the operations comprise disabling the cash advance service by default.

3. The system of claim 1, wherein the operations comprise:
   receiving, from the user device, a request to disable the cash advance service prior to an expiration of the window of time; and
   in response to the second request, modifying the transaction rule such that the condition is not applied for a subsequent cash advance transaction authorization request.

4. The system of claim 1, wherein the operations comprise:
   setting, in response to the request to enable the cash advance service, a timer associated with a duration of the window of time.

5. The system of claim 4, wherein the operations comprise:
   providing, to the user device, data indicative of the duration of the window of time, the data being synchronized with the timer.

6. The system of claim 1, wherein the operations comprise:
   providing, to the user device, instructions for displaying information representing a remaining time in which the cash advance service is enabled, the remaining time being based on the window of time.

7. The system of claim 1, wherein the operations comprise:
   disabling the cash advance service after the window of time expires.

8. The system of claim 1, wherein the operations comprise:
   providing, to the user device, instructions for displaying an indication of whether the cash advance service is enabled or disabled.

9. A computer-implemented method for managing a cash advance service associated with a payment account of a user, the method comprising:

receiving a first cash advance transaction authorization request from a computing device associated with the payment account;
determining, responsive to the cash advance transaction authorization request, whether a cash advance service is enabled,
responsive to a determination that the cash advance service is not enabled, declining the cash advance transaction authorization request and providing, to a device of the user, instructions to display an application interface, the application interface receiving user requests to enable and disable the cash advance service;
receiving, through the application interface, a request to enable the cash advance service;
in response to the request to enable the cash advance service, associating a transaction rule with the payment account, the transaction rule defining a condition upon which approval of a cash advance transaction is permitted, the condition specifying a window of time;
receiving a second cash advance transaction authorization request from a computing device associated with the payment account;
temporarily enabling the cash advance service;
determining, responsive to the second cash advance transaction authorization request, whether the transaction rule is satisfied, the transaction rule being satisfied when the cash advance transaction authorization request is received before an expiration of the window of time, the window of time being a predetermined duration;
approving the cash advance transaction authorization request when the transaction rule is satisfied;
declining the cash advance transaction authorization request when the transaction rule is not satisfied;
transmitting the determination to the computing device; and
reverting the cash advance service to a default setting.

10. The method of claim 9, comprising disabling the cash advance service by default.

11. The method of claim 9, comprising:
receiving, from the user device, a second request to disable the cash advance service prior to an expiration of the window of time; and
in response to the second request, modifying the transaction rule such that the condition is not applied for a subsequent cash advance transaction authorization request.

12. The method of claim 9, comprising:
setting, in response to the request to enable the cash advance service, a timer associated with a duration of the window of time.

13. The method of claim 12, comprising:
providing, to the user device, data indicative of the duration of the window of time,
the data being synchronized with the timer.

14. The method of claim 9, comprising:
providing, to the user device, instructions for displaying information representing a remaining time in which the cash advance service is enabled, the remaining time being based on the time window of time.

15. The method of claim 9, comprising:
disabling the cash advance service after the window of time expires.

16. A non-transitory computer-readable medium storing instructions executable by a processor to cause the processor to perform operations for managing a cash advance service associated with a payment account of a user, the operations comprising:
providing, to a device of the user, instructions to display an application interface, the application interface receiving user requests to enable and disable the cash advance service;
receiving a first cash advance transaction authorization request from a computing device associated with the payment account;
determining, responsive to the cash advance transaction authorization request, whether a cash advance service is enabled,
responsive to a determination that the cash advance service is not enabled, declining the cash advance transaction authorization request and providing, to a device of the user, instructions to display an application interface, the application interface receiving user requests to enable and disable the cash advance service;
receiving, through the application interface, a request to enable the cash advance service;
in response to the request to enable the cash advance service, associating a transaction rule with the payment account, the transaction rule defining a condition upon which approval of a cash advance transaction is permitted, the condition specifying a window of time;
receiving a second cash advance transaction authorization request from a computing device associated with the payment account;
temporarily enabling the cash advance service;
determining, responsive to the second cash advance transaction authorization request, whether the transaction rule is satisfied, the transaction rule being satisfied when the cash advance transaction authorization request is received before an expiration of the window of time, the window of time being a predetermined duration;
approving the cash advance transaction authorization request when the transaction rule is satisfied;
declining the cash advance transaction authorization request when the transaction rule is not satisfied;
transmitting the determination to the computing device; and
reverting the cash advance service to a default setting.

* * * * *